(12) United States Patent
Warren

(10) Patent No.: US 10,063,088 B2
(45) Date of Patent: Aug. 28, 2018

(54) COMPUTING DEVICE INDUCTIVE CHARGING CASES AND METHODS OF USE

(71) Applicant: William J. Warren, Frisco, TX (US)

(72) Inventor: William J. Warren, Frisco, TX (US)

( * ) Notice: Subject to any disclaimer, the term of this patent is extended or adjusted under 35 U.S.C. 154(b) by 0 days.

(21) Appl. No.: 15/433,929

(22) Filed: Feb. 15, 2017

(65) Prior Publication Data
US 2017/0163080 A1 Jun. 8, 2017

Related U.S. Application Data

(63) Continuation-in-part of application No. 15/252,005, filed on Aug. 30, 2016, and a continuation-in-part of application No. 15/252,018, filed on Aug. 30, 2016, each which is a continuation-in-part of application No. 15/139,215, filed on Apr. 26, 2016, which is a continuation-in-part of application No. 15/008,402, filed on Jan. 27, 2016, now Pat. No. 9,627,802, which is a continuation-in-part of application No. 14/634,568, filed on Feb. 27, 2015, now Pat. No. 9,620,911.

(Continued)

(51) Int. Cl.
H02J 7/00 (2006.01)
H02J 7/02 (2016.01)
H02J 50/10 (2016.01)

(52) U.S. Cl.
CPC ............ *H02J 7/025* (2013.01); *H02J 7/0044* (2013.01); *H02J 7/0052* (2013.01); *H02J 50/10* (2016.02); *H02J 2007/0062* (2013.01)

(58) Field of Classification Search
USPC .................................................. 320/107, 108
See application file for complete search history.

(56) References Cited

U.S. PATENT DOCUMENTS

| 2,392,445 A | 1/1946 | Anderson |
| 4,536,694 A | 8/1985 | McCarty et al. |

(Continued)

FOREIGN PATENT DOCUMENTS

| EP | 2228263 A1 | 9/2010 |
| WO | WO2016003585 | 1/2016 |

OTHER PUBLICATIONS

Office Action, dated Aug. 25, 2016, U.S. Appl. No. 14/634,568, filed Feb. 27, 2015.

(Continued)

*Primary Examiner* — Robert Grant
(74) *Attorney, Agent, or Firm* — Carr & Ferrell LLP

(57) ABSTRACT

Electrical inductive charging device chassis and cases are provided herein. An example charging case includes a device receiving tray, a sliding tray having a charging interface and an inductive charging base, a stabilizer tray, and a gear having teeth that cooperate with a grooved track of the sliding tray such that when the gear is rotated, the teeth of the gear translate the sliding tray backwards and forwards to retract and extend the sliding tray and charging interface. Another example charging case includes a device receiving tray that protectingly surrounds a computing device, an inductive charging base, a charging interface selectively extendable from the charging case, and an extendable stabilizer that is translatable between a stored configuration and a deployed configuration.

25 Claims, 21 Drawing Sheets

Related U.S. Application Data

(60) Provisional application No. 61/998,497, filed on Jun. 29, 2014, provisional application No. 61/998,646, filed on Jul. 2, 2014, provisional application No. 61/998,649, filed on Jul. 3, 2014, provisional application No. 61/998,770, filed on Jul. 6, 2014, provisional application No. 62/124,684, filed on Dec. 29, 2014, provisional application No. 62/321,992, filed on Apr. 13, 2016, provisional application No. 62/331,163, filed on May 3, 2016, provisional application No. 62/333,019, filed on May 6, 2016, provisional application No. 62/333,177, filed on May 7, 2016, provisional application No. 62/335,288, filed on May 12, 2016, provisional application No. 62/337,275, filed on May 16, 2016, provisional application No. 62/330,859, filed on May 3, 2016, provisional application No. 62/330,896, filed on May 3, 2016, provisional application No. 62/231,762, filed on Jul. 14, 2015, provisional application No. 62/179,669, filed on May 14, 2015, provisional application No. 62/231,762, filed on Jul. 14, 2015, provisional application No. 62/140,235, filed on Nov. 6, 2016, provisional application No. 62/422,697, filed on Nov. 16, 2016, provisional application No. 62/427,115, filed on Nov. 28, 2016.

(56) References Cited

U.S. PATENT DOCUMENTS

| | | | |
|---|---|---|---|
| 5,305,381 A | 4/1994 | Wang et al. | |
| 5,587,645 A | 12/1996 | Sciammarella et al. | |
| 5,648,712 A | 7/1997 | Hahn | |
| 5,679,017 A | 10/1997 | Smith | |
| 5,762,512 A | 6/1998 | Trant et al. | |
| 6,029,215 A * | 2/2000 | Watts, Jr. | G06F 1/1632 361/679.32 |
| 6,091,611 A | 7/2000 | Lanni | |
| 6,510,067 B1 | 1/2003 | Toebes | |
| 6,518,724 B2 | 2/2003 | Janik | |
| 6,831,848 B2 | 12/2004 | Lanni | |
| 6,848,802 B2 | 2/2005 | Chen | |
| 6,861,822 B2 | 3/2005 | Wei | |
| 6,938,867 B2 | 9/2005 | Dirks | |
| 7,066,767 B2 | 6/2006 | Liao | |
| 7,075,779 B2 | 7/2006 | Bothe et al. | |
| 7,166,987 B2 | 1/2007 | Lee et al. | |
| 7,254,424 B1 | 8/2007 | Reichert | |
| 7,524,197 B2 | 4/2009 | Mills et al. | |
| 7,528,323 B2 | 5/2009 | Wu et al. | |
| 7,540,748 B2 | 6/2009 | Tracy et al. | |
| 7,623,182 B2 | 11/2009 | Byrne et al. | |
| 7,654,855 B2 | 2/2010 | Liao | |
| 7,682,185 B2 | 3/2010 | Liao | |
| 7,699,664 B2 | 4/2010 | Kim et al. | |
| 7,850,484 B2 | 12/2010 | Hayashi et al. | |
| 7,857,659 B2 | 12/2010 | Wang et al. | |
| 7,887,341 B2 | 2/2011 | Liao | |
| 8,113,873 B1 | 2/2012 | Sarraf | |
| D676,380 S | 2/2013 | Sun | |
| 8,415,920 B2 | 4/2013 | Liao | |
| D687,375 S | 8/2013 | Franco | |
| 8,686,683 B2 | 4/2014 | Caskey et al. | |
| 8,712,482 B2 | 4/2014 | Sorias et al. | |
| 8,794,997 B2 | 8/2014 | Tin | |
| 8,864,517 B2 | 10/2014 | Cohen | |
| D723,457 S | 3/2015 | Sorias | |
| 9,130,332 B2 | 9/2015 | Yosef | |
| 9,161,464 B2 | 10/2015 | Liao | |
| 9,356,454 B2 | 5/2016 | Caren et al. | |
| D760,647 S | 7/2016 | Chen | |
| D762,169 S | 7/2016 | Lei | |
| D783,526 S | 4/2017 | Warren | |
| 9,620,911 B2 | 4/2017 | Warren | |
| 9,627,802 B2 | 4/2017 | Warren | |
| D791,070 S | 7/2017 | Son | |
| D791,076 S | 7/2017 | Kim | |
| D791,697 S | 7/2017 | Precheur | |
| D795,190 S | 8/2017 | Tzeng | |
| 9,742,107 B2 | 8/2017 | Choi et al. | |
| 2003/0218445 A1 | 11/2003 | Behar | |
| 2005/0178633 A1 | 8/2005 | Liao | |
| 2006/0194467 A1 | 8/2006 | Beasley et al. | |
| 2007/0258204 A1 | 11/2007 | Chang et al. | |
| 2008/0157715 A1 | 7/2008 | Rosenboom et al. | |
| 2008/0227380 A1 | 9/2008 | Hsu et al. | |
| 2009/0047827 A1 | 2/2009 | Liao | |
| 2012/0049800 A1 | 3/2012 | Johnson et al. | |
| 2012/0077361 A1 | 3/2012 | Youssefi-Shams et al. | |
| 2012/0178506 A1 | 7/2012 | Sorias et al. | |
| 2012/0214348 A1 | 8/2012 | Youssefi-Shams et al. | |
| 2013/0057215 A1 | 3/2013 | Rajeswaran et al. | |
| 2013/0093220 A1 * | 4/2013 | Pajic | A47C 7/70 297/163 |
| 2013/0150134 A1 | 6/2013 | Pliner et al. | |
| 2013/0178252 A1 | 7/2013 | Sorias et al. | |
| 2014/0030912 A1 | 1/2014 | Cohen | |
| 2015/0011265 A1 | 1/2015 | Walsh, Jr. | |
| 2015/0015204 A1 | 1/2015 | Sorias et al. | |
| 2015/0207286 A1 | 7/2015 | Chen et al. | |
| 2015/0207350 A1 | 7/2015 | Chen et al. | |
| 2015/0263447 A1 | 9/2015 | Liao | |
| 2015/0380872 A1 | 12/2015 | Warren | |
| 2016/0087381 A1 | 3/2016 | Wong et al. | |
| 2016/0118758 A1 | 4/2016 | Cymerman | |
| 2016/0141815 A1 | 5/2016 | Warren | |
| 2016/0204816 A1 | 7/2016 | Abramovich | |
| 2016/0209885 A1 | 7/2016 | Ellis | |
| 2016/0218536 A1 | 7/2016 | Caren et al. | |
| 2016/0261129 A1 | 9/2016 | Warren | |
| 2016/0380457 A1 | 12/2016 | Criss | |
| 2017/0005496 A1 | 1/2017 | Warren | |
| 2017/0012450 A1 | 1/2017 | Warren | |
| 2017/0101256 A1 | 4/2017 | Zeitlin | |

OTHER PUBLICATIONS

Office Action, dated Sep. 12, 2016, U.S. Appl. No. 15/008,402, filed Jan. 27, 2016.
Notice of Allowance, dated Jan. 23, 2017, U.S. Appl. No. 14/634,568, filed Feb. 27, 2015.
Notice of Allowance, dated Feb. 1, 2017, U.S. Appl. No. 15/008,402, filed Jan. 27, 2016.
International Search Report and Written Opinion dated Sep. 4, 2015 for Patent Cooperation Treaty Application PCT/US2015/034073, filed Jun. 3, 2015, 8 pages.

* cited by examiner

COMPUTING DEVICE INDUCTIVE CHARGING CASES AND METHODS OF USE

CROSS-REFERENCE TO RELATED APPLICATIONS

The present application is a Continuation-in-Part of U.S. patent application Ser. No. 15/252,005, filed on Aug. 30, 2016, and is also a Continuation-in-Part of U.S. patent application Ser. No. 15/252,018, filed on Aug. 30, 2016; both U.S. patent application Ser. No. 15/252,005 and U.S. patent application Ser. No. 15/252,018 are Continuation-in-Parts of U.S. patent application Ser. No. 15/139,215, filed on Apr. 26, 2016, which is a Continuation-in-Part of U.S. patent application Ser. No. 15/008,402, filed on Jan. 27, 2016, which is a Continuation-in-Part of U.S. patent application Ser. No. 14/634,568, filed on Feb. 27, 2015, which claims the benefit of U.S. Provisional Application No. 61/998,497, filed on Jun. 29, 2014, of U.S. Provisional Application No. 61/998,646, filed on Jul. 2, 2014, of U.S. Provisional Application No. 61/998,649, filed on Jul. 3, 2014, of U.S. Provisional Application No. 61/998,770, filed on Jul. 6, 2014, and of U.S. Provisional Application No. 62/124,684, filed on Dec. 29, 2014; U.S. patent application Ser. No. 15/252,018 also claims the benefit of U.S. Provisional Application No. 62/321,992, filed on Apr. 13, 2016, of U.S. Provisional Application No. 62/331,163, filed on May 3, 2016, of U.S. Provisional Application No. 62/333,019, filed on May 6, 2016, of U.S. Provisional Application No. 62/333,177, filed on May 7, 2016, of U.S. Provisional Application No. 62/335,288, filed on May 12, 2016, and of U.S. Provisional Application No. 62/337,275, filed on May 16, 2016; U.S. patent application Ser. No. 15/252,005 also claims the benefit of U.S. Provisional Application No. 62/330,859, filed on May 3, 2016, and of U.S. Provisional Application No. 62/330,896, filed on May 3, 2016; U.S. patent application Ser. No. 15/139,215 also claims the benefit of U.S. Provisional Application No. 62/231,762, filed on Jul. 14, 2015; U.S. patent application Ser. No. 15/008,402 also claims the benefit of U.S. Provisional Application No. 62/179,669, filed on May 14, 2015, and of U.S. Provisional Application No. 62/231,762, filed on Jul. 14, 2015; the present application also claims the benefit of U.S. Provisional Application No. 62/410,235, filed on Nov. 6, 2016, of U.S. Provisional Application No. 62/422,697, filed on Nov. 16, 2016, and of U.S. Provisional Application No. 62/427,115, filed on Nov. 28, 2016. All of the above applications are hereby incorporated by reference herein for all purposes including all references and appendices cited therein.

FIELD OF TECHNOLOGY

The present technology pertains to charging cases for electronic devices such as Smartphones, and more specifically, but not by way of limitation, to charging cases that comprise a static or deployable DC or AC electrical connector (such as USB or electrical prongs) that extends from a compartment of the charging cases using a track and gear assembly.

SUMMARY

According to some embodiments, the present technology is directed to a charging apparatus for a computing device, the charging apparatus comprising: (a) a device receiving tray disposed above a sliding tray, the device receiving tray for receiving and retaining a computing device; (b) the sliding tray comprising: (i) a charging interface that receives power from a power source; (ii) an inductive charging base having a primary coil that generates a magnetic field, the inductive charging base coupled to the charging interface; and (iii) a grooved track; (c) a stabilizer tray that is disposed underneath the sliding tray, the stabilizer tray also in sliding relationship with the sliding tray, the stabilizer tray further comprising a stabilizer; and (d) a gear having teeth that cooperate with the grooved track such that when the gear is rotated, the teeth of the gear translate the sliding tray backwards and forwards to retract and extend the sliding tray and the charging interface.

According to some embodiments, the present technology is directed to a charging case for a computing device, comprising: (a) a device receiving tray that protectingly surrounds a computing device in such a way that a touchscreen display or keyboard is at least partially exposed to allow a user to utilize the touchscreen display or keyboard; (b) an inductive charging base having a primary coil that generates a magnetic field, the inductive charging base being disposed within a middle compartment of the charging case, the middle compartment being disposed behind or below the device receiving tray; (c) a charging interface selectively extendable from the charging case, the charging interface being coupled to the inductive charging base; and (d) an extendable stabilizer disposed within a rearward compartment behind the middle compartment, the extendable stabilizer translatable between a stored configuration and a deployed configuration.

According to some embodiments, the present technology is directed to a case for a computing device, comprising: (a) a charging case that protectingly surrounds a computing device; (b) a first compartment coupled to a rearward portion of the charging case; (c) an inductive charging base having a primary coil that generates a magnetic field, the inductive charging base being within the first compartment; (d) a charging interface extendable from the charging case, the charging interface disposed within the first compartment and coupled to the inductive charging base; (e) a second compartment coupled to a rearward portion of the first compartment; and (f) a stabilizer that is extendable from the second compartment.

BRIEF DESCRIPTION OF THE DRAWINGS

The accompanying drawings, where like reference numerals refer to identical or functionally similar elements throughout the separate views, together with the detailed description below, are incorporated in and form part of the specification, and serve to further illustrate embodiments of concepts that include the claimed disclosure, and explain various principles and advantages of those embodiments.

The methods and systems disclosed herein have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION

Figure 1A:
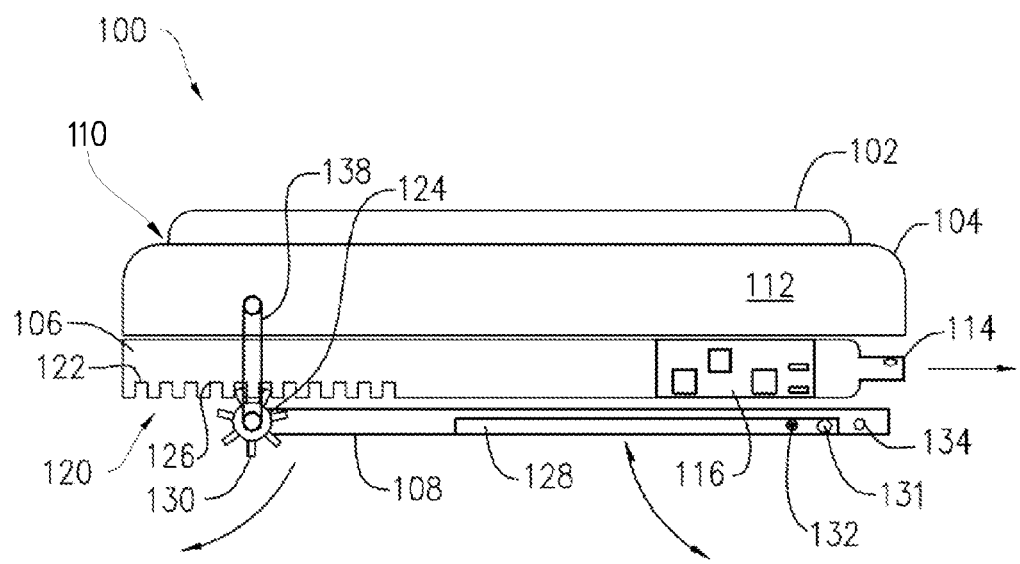
FIG. 1A is a cross sectional view of an example device of the present disclosure with components in a stored configuration.

Generally described, the present technology involves devices that are used to charge electronic devices. Example types of electronic devices that can be charged using the present technology include, but are not limited to, cellular telephones, Smartphones, PDAs, tablets, phablets, laptops, or any other mobile electronic device that requires recharging through an electrical interface or charging port, using any of direct current and/or alternating current.

FIGS. 1A-2A collectively illustrate an example apparatus or charging device (case) 100 of the present disclosure. The charging device 100 can be utilized to charge a computing device, such as computing device 102 associated with the charging device 100.

In general, charging device 100 may comprise a series of stacked trays or layers where at least one of the trays comprises a charging interface or assembly that can be extended and retracted. When extended, the charging interface can be plugged into an AC or DC power source depending on the type of charging interface. For example, a charging interface comprising a USB port can be used when DC power is available. In another example, a charging interface comprising electrical prongs can be used when AC power is available.

Some embodiments comprise a stabilizer plate or device that can be stored and deployed to support a portion of the weight of the charging device 100 and/or computing device 102 associated therewith.

In one embodiment, the charging device 100 comprises three distinct trays or enclosures such as a device receiving tray 104, a sliding tray 106, and a stabilizer tray 108. In some embodiments, the device receiving tray 104 receives the computing device 102. For example, the device receiving tray 104 comprises a support plate 110 and a sidewall 112 that extends around a periphery of the support plate 110. The computing device 102 resides within the area enclosed by the sidewall 112.

According to some embodiments, the sliding tray 106 is disposed underneath the device receiving tray 104. The sliding tray 106 is configured to slide along an underneath the device receiving tray 104. In various embodiments, the sliding tray 106 and the device receiving tray 104 may be hingedly coupled at one or more points. In other embodiments, the sliding tray 106 and the device receiving tray 104 may be coupled at one or more points along a periphery of the sliding tray 106 and the device receiving tray 104.

In some embodiments, the sliding tray 106 comprises a charging assembly that comprises a charging interface 114 that receives power from a power source. The charging device 100 is illustrated in association with a power source, such as a wall outlet in FIG. 5.

In one embodiment, the charging interface is selected from any of electrical prongs and a USB connector (either disposed in vertical or horizontal orientation). Other types of connectors/electrical conductors can also be utilized such as micro USB and firewire connectors.

In some embodiments, the sliding tray 106 comprises a charging circuit 116 that receives power and provides an electrical charge to the computing device 102.

Figure 3:
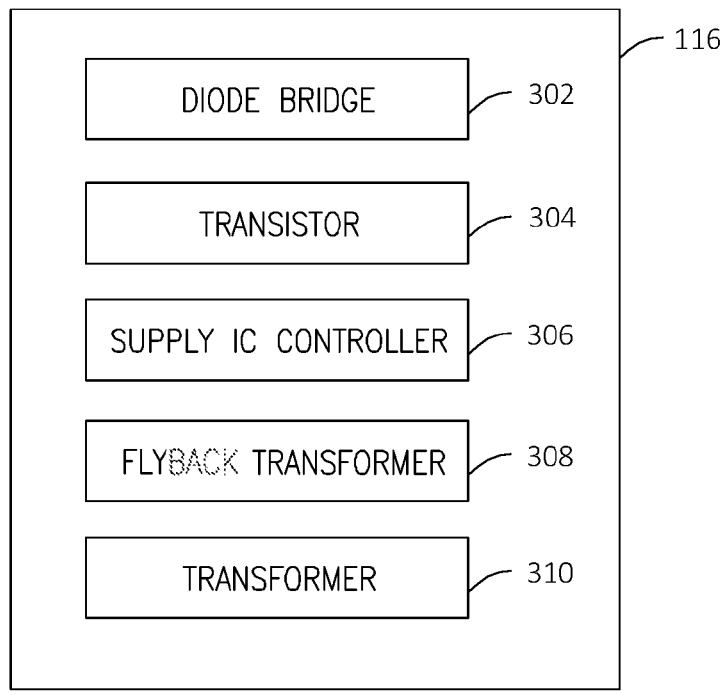
FIG. 3 is an example charging circuit for use in the example devices of the present disclosure.
Figure 4:
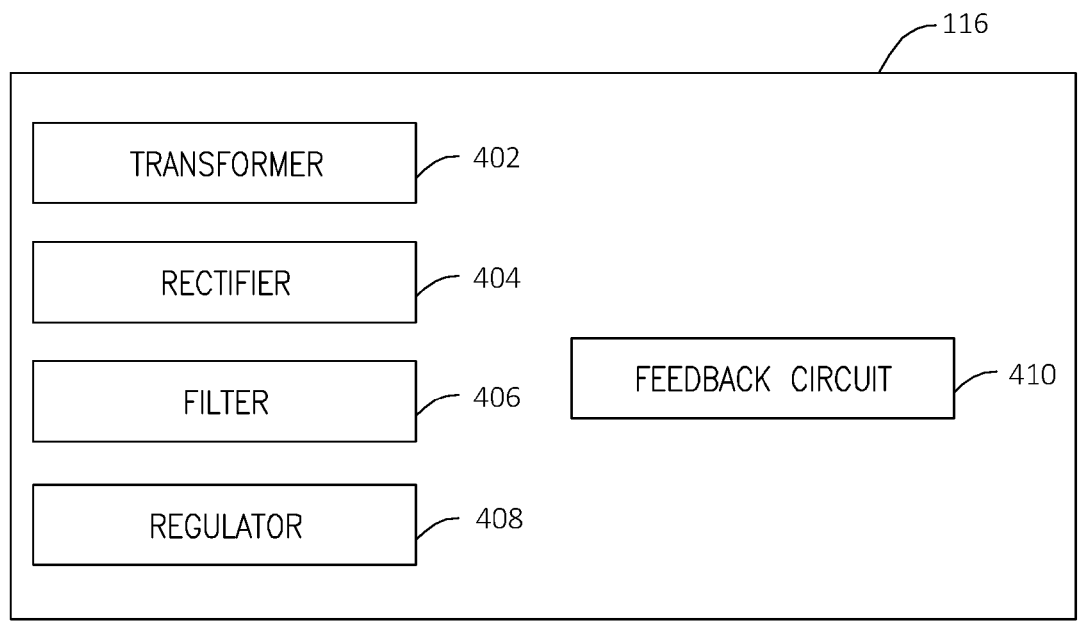
FIG. 4 is another example charging circuit for use in the example devices of the present disclosure.

FIGS. 3 and 4 illustrate two example circuits that can be used to process the AC or DC power received from a power source so as to provide the computing device 102 with a suitable electrical charge based on the requirements of the computing device.

As illustrated in FIG. 3, according to some embodiments, the charging circuit 116 can comprise a printed circuit board with various permutations of electrical components. In general, the charging circuit 116 is configured to transform the AC power waveform received from an outlet into DC power that is appropriate for charging the electronic device.

In some embodiments, the charging circuit 116 can include combinations of electrolytic capacitors, MOSFET switching transistors, flyback transformers, a controller integrated circuit, capacitors, diodes, R-C snubber circuits, EMI (electromagnetic interference) circuits, inductors, control chips, Schottky diodes, Tantalum filter capacitors, as well as any combinations thereof, in order to provide the desired transformation of AC to DC functions.

In some embodiments, the charging circuit 116 is an advanced flyback switching power supply that receives the AC voltage in ranges of 100 to 240 volts, and produces approximately five watts of smooth voltage power. AC line power is converted to high voltage DC current using a diode bridge 302. The DC power is switched off and on by a transistor 304 controlled by a power supply IC controller 306. The charging circuit 116 can also comprise a transformer 310 that converts the DC power to a low voltage AC waveform.

In other embodiments, a chopped DC power supply is fed back into a transformer 310 (which can include a flyback transformer 308), which converts the DC power to a low voltage AC waveform. The AC waveform is then converted into DC using a rectifier and then filtered with a filter to obtain smooth power that is substantially free of interference. This smoothed power is provided to a USB port (e.g., charging interface 114 of FIG. 1A).

While the use of a USB port is contemplated, the charging interface can be selectively changed depending upon the type of electrical device that needs to be charged. Other examples include power over Ethernet, firewire, MIDI, Thunderbolt, and so forth.

In another example circuit, illustrated in FIG. 4, the charging circuit 116 comprises a transformer 402 that performs a step down of the AC voltage received from an outlet to a working output voltage. A rectifier 404 then converts the stepped down voltage from AC to DC. In some embodiments, the rectifier 404 is a full wave bridge rectifier. A filter 406, such as a capacitor may be used to smooth the DC voltage. A regulator 408 can also be employed to even further smooth the DC current. For example, a Zener diode or IC voltage regulator can be utilized. The charging circuit 116 can comprise a feedback circuit 410 that measures the voltage output to the charging interface 114 and sends a signal to the power supply IC controller, which adjusts the switching frequency to obtain a desired voltage.

The circuits of FIGS. 3 and 4 are merely example circuits that can be used to transform the AC power received at a wall outlet to a DC power feed that can be used to charge an electronic device without causing any damage to the circuitry of the electronic device. In some embodiments, components from the circuits of FIGS. 3 and 4 can be combined into a single circuit.

To be sure, the charging circuit 116 can also be configured to amplify or reduce DC power received from an electrical outlet. In one embodiment, the electrical outlet includes a USB port that is configured to deliver DC power. Some embodiments of USB connectors, and specifically wall outlet based USB connections may carry AC power. Thus, the charging circuit 116 can be configured with any of the components of FIGS. 3 and 4 above to deliver the correct type of power.

In some embodiments, the charging circuit 116 can be omitted all together, such as when the DC source provides a DC power signal that does not require amplification or any signal processing.

Rather than plugging into a USB electrical outlet, the electrical connector can be coupled with a USB port of another computing device, such as a laptop computer or a charger device that plugs into a standard two or three pronged electrical wall outlet.

Referring back to FIGS. 1A-2A, in some embodiments, the sliding tray 106 comprises a support plate 110 having an integrated (or grooved) track 120. The track 120 is comprised of an alternating series of notches, such as notch 122, which create an approximate saw tooth configuration. The shape, size, number, and spacing of the notches depend on a tooth profile gear 124. The track 120 and gear 124 cooperate to create a track and gear assembly that functions to extend and retract the sliding tray by cooperative operation of the track 120 and gear 124, as will be discussed in greater detail below.

In some embodiments, the stabilizer tray 108 is disposed underneath the sliding tray 106. The stabilizer tray 108 is also in sliding relationship with the sliding tray 106. That is, the sliding tray 106 can translate backwards and forwards relative to the device receiving tray 104 and the stabilizer tray 108.

In some embodiments, the gear 124 comprises teeth 130 that cooperate with the grooved track 120 such that when the gear 124 is rotated, the teeth 130 of the gear translate the sliding tray 106 either backwards and forwards to retract or extend the sliding tray 106 and the charging interface 114.

The teeth 130 of the gear 124 are sized to cooperate with the grooved track 120 to drive the sliding tray 106 extension and/or retraction. In one embodiment, the gear 124 rotates on a gear shaft 126. The gear shaft 126 can be fixedly but rotatably coupled to the stabilizer tray 108. A portion of the teeth 130 of the gear 124 extend at least partially below the stabilizer tray 108 to allow the user to rotate the gear 124.

In one embodiment, the stabilizer tray 108 is hingedly coupled with the sliding tray 106 in such a way that the gear 124 can remain in contact with the track 120 at all times. In another embodiment, the stabilizer tray 108 is hingedly coupled with the sliding tray 106 so that the gear 124 can remain in contact with the track 120 when the stabilizer tray 108 is folded into contacting relationship with the sliding tray 106.

In one embodiment, the stabilizer bar 131 is coupled with the device receiving tray 104 using, for example, an armature 138. The armature 138 holds the device receiving tray 104 and stabilizer tray 108 in connected relationship to one another, while allowing the sliding tray 106 to slide therebetween.

In some embodiments, rotation of the gear 124 in a first direction (e.g., clockwise) causes the sliding tray 106 to translate forwardly to extend the charging interface 114 into a deployed position. Likewise, rotation of the gear 124 in a second direction (e.g., counter-clockwise) causes the sliding tray 106 to translate backwardly to retract the charging interface 114 into a stored position (see FIG. 1A).

Thus, in some embodiments, the stabilizer tray 108 can hinge between a mating configuration (see FIG. 1A) where the stabilizer tray 108 abuts the sliding tray 106. In other embodiments, the stabilizer tray 108 can be hinged away from the sliding tray 106 in a deployed configuration, such as when the charging device 100 is connected to a power source.

In one embodiment, the stabilizer tray 108 may be hingedly coupled with the sliding tray 106. In another embodiment, the stabilizer tray 108 may be connected to the sliding tray 106 via a pivot point hinge. In some embodiments, the stabilizer tray 108 and the sliding tray 106 may be hingedly coupled at one or more points. In other embodiments, the stabilizer tray 108 and the sliding tray 106 may be coupled at one or more points along a periphery of the stabilizer tray 108 and the sliding tray 106.

In one embodiment, the stabilizer tray 108 comprises a stabilizer that is a plate 128 that is hingedly associated with a stabilizer bar 131 of the stabilizer tray 108.

Figure 1B:
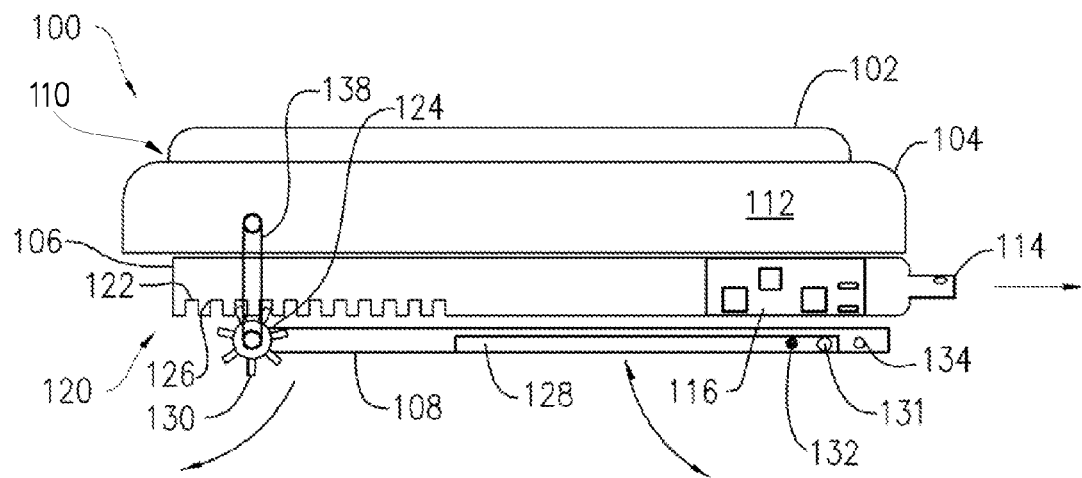
FIG. 1B is a cross sectional view of an example device of the present disclosure with components in a deployed configuration.
Figure 2A:
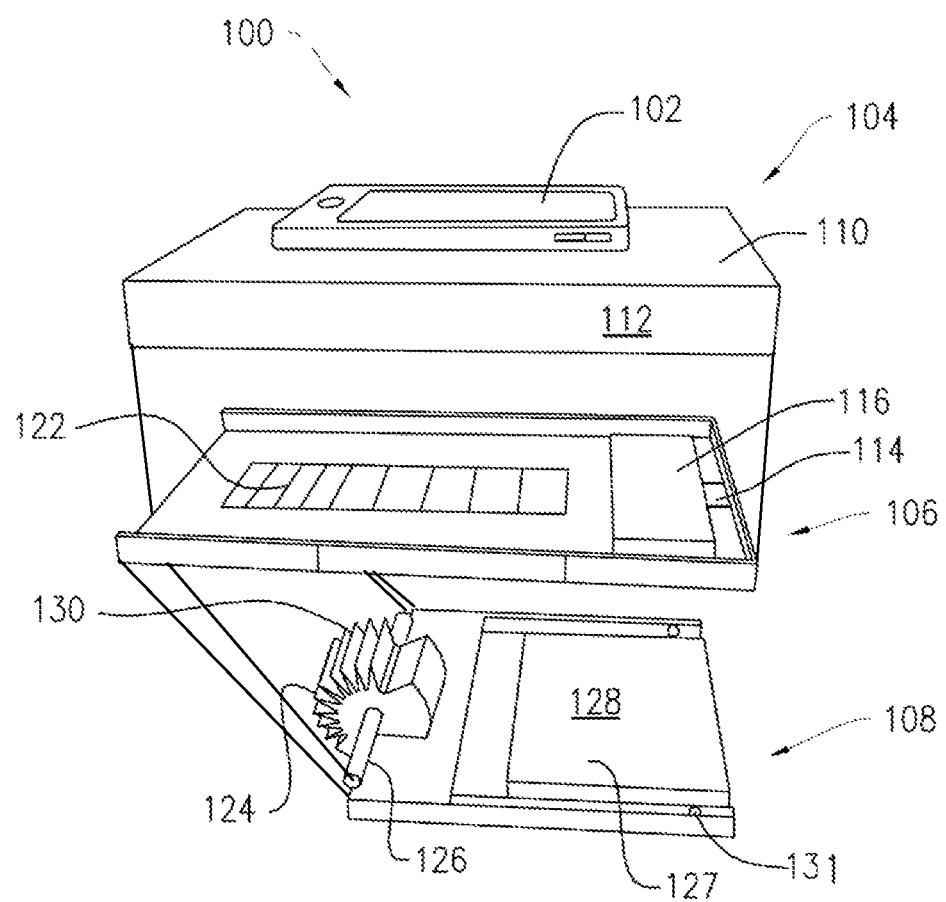
FIG. 2A is an exploded view of the example device of FIGS. 1A-1B.
Figure 2B:
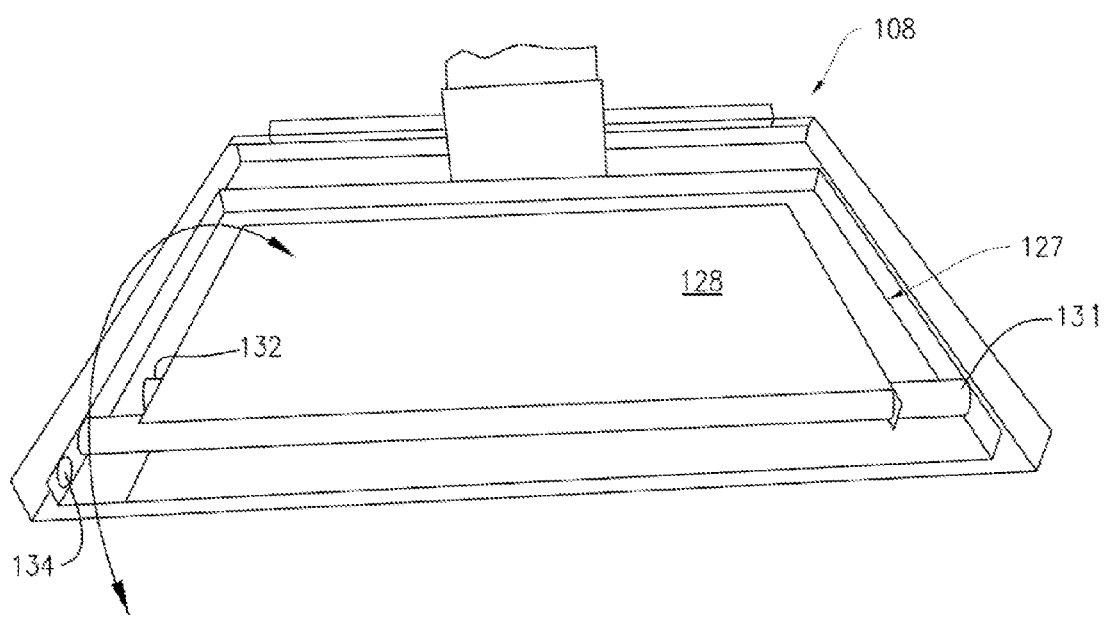
FIG. 2B is a front perspective view of a stabilizer tray of the example device of FIGS. 1A-2A in an unlocked configuration.
Figure 2C:
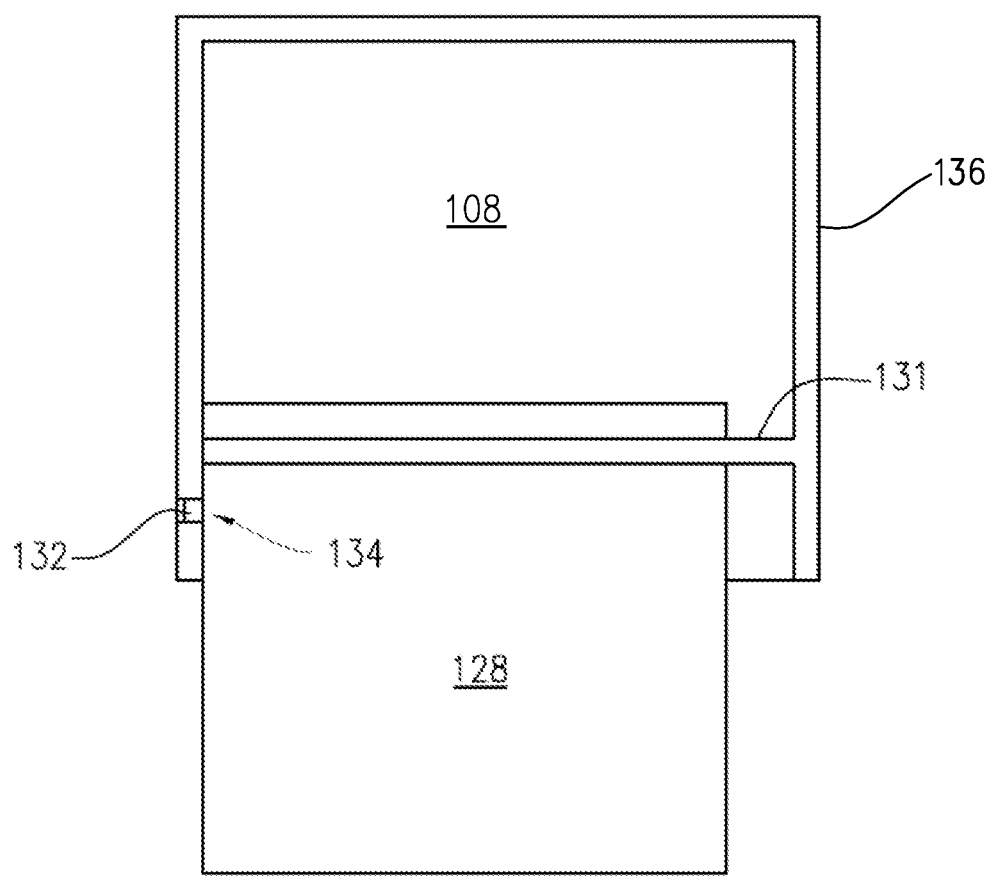
FIG. 2C is a front perspective view of a stabilizer tray of the example device of FIGS. 1A-2B in a locked configuration.

As illustrated in FIGS. 2B-2C, the stabilizer 127 can rotate from a stored position (see FIG. 1A) within the stabilizer tray 108 and a deployed position as illustrated in FIG. 1B. The stabilizer 127 rotates about the stabilizer bar 131.

In some embodiments, the stabilizer 127 selectively slides in a lateral movement along the stabilizer bar 131 between a locked position (see FIG. 2C) and an unlocked position (see FIG. 2B). In one embodiment, the stabilizer 127 comprises a peg 132 on an edge thereof that engages with an aperture 134 in a sidewall 136 of the stabilizer tray 108 to lock the stabilizer 127 in position. The stabilizer 127 is slid away from the aperture 134 to unlock the stabilizer 127. The stabilizer 127 can then be rotated back into a stored position within the stabilizer tray 108.

When assembled, the charging device 100 allows for translation of the sliding tray 106 between two different positions, both extended and retracted. Movement of the sliding tray 106 causes movement of the charging interface 114 due to the mounting or association of the charging interface 114 with the sliding tray 106.

In some embodiments, the sliding tray 106 can slide relative to both the device receiving tray 104 and the stabilizer tray 108, while the device receiving tray 104 and the stabilizer tray 108 remain stationary. This movement of the sliding tray 106 allows for selective deployment and storage of the charging interface 114.

Figure 5:
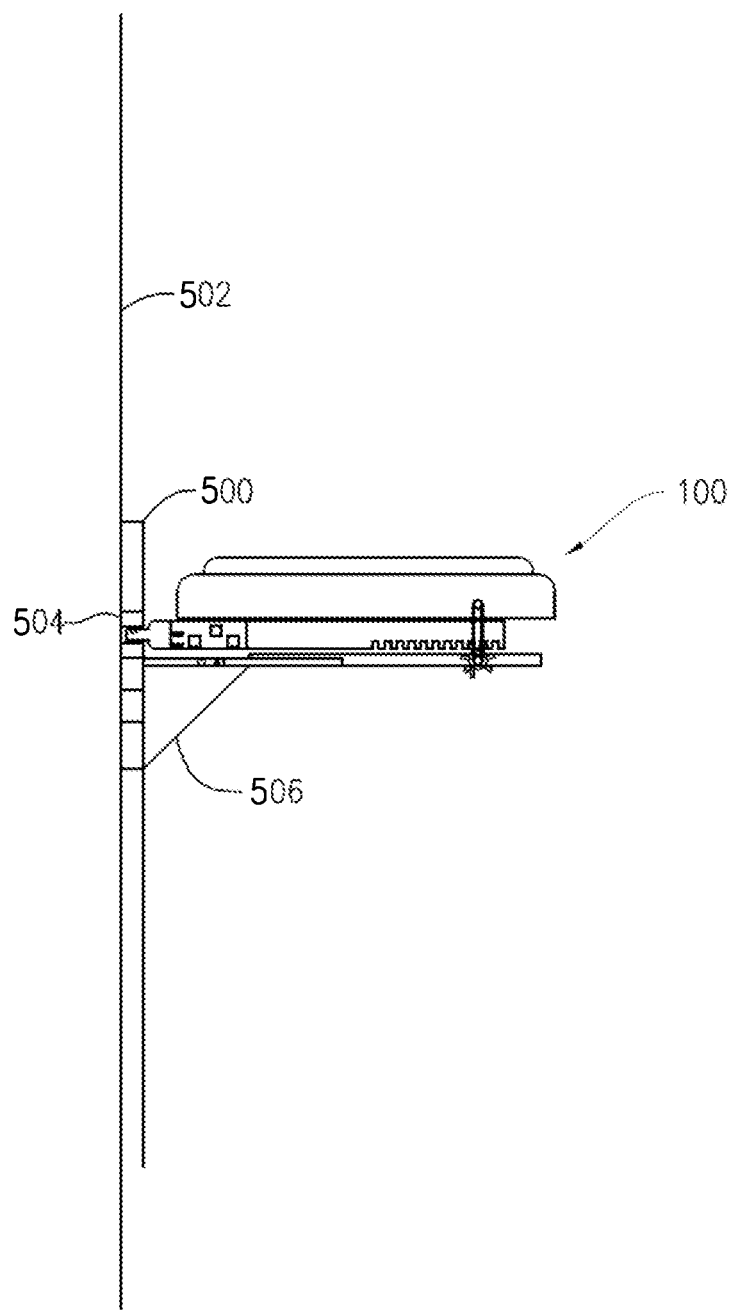
FIG. 5 is a side elevation view of the example device in association with a power source, such as a wall outlet.

FIG. 5 illustrates an example embodiment of the charging device 100, also sometimes referred to herein as charging case 100 of FIG. 1 in use. For example, the charging case 100 can be coupled with an electrical outlet 500 of a wall 502. The wall 502 is a vertically oriented surface that supports the charging case 100. When the charging interface 504, such as electrical prongs, is inserted into the electrical outlet 500, a stabilizer 506, when in the deployed configuration, contacts a portion of the wall 502 below the electrical outlet 500 or the electrical outlet 500 itself. Again, the stabilizer 506 supports at least a portion of the weight of the charging case 100 and the computing device disposed therein.

Figure 6:
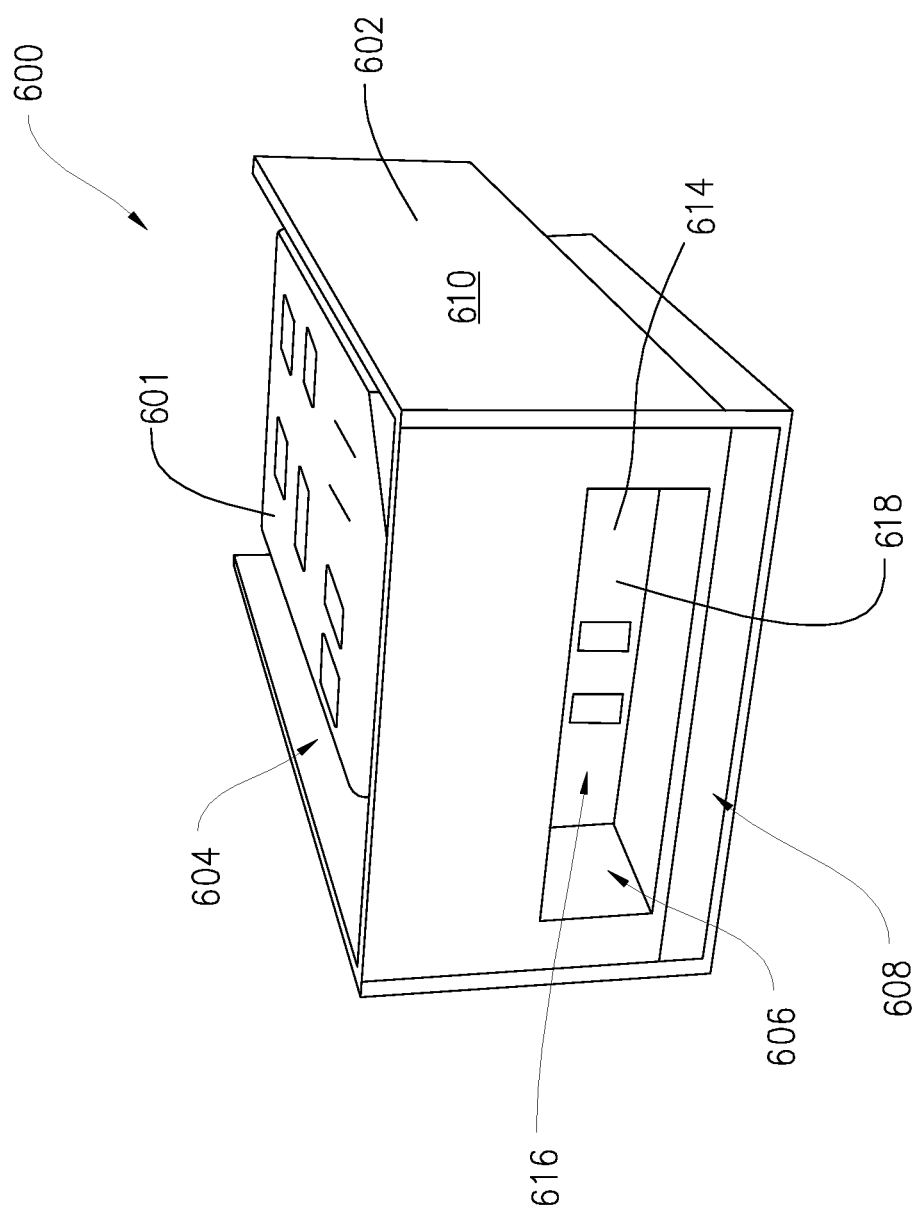
FIG. 6 is a front perspective view of an example device of the present disclosure with components in a stored configuration.
Figure 7:
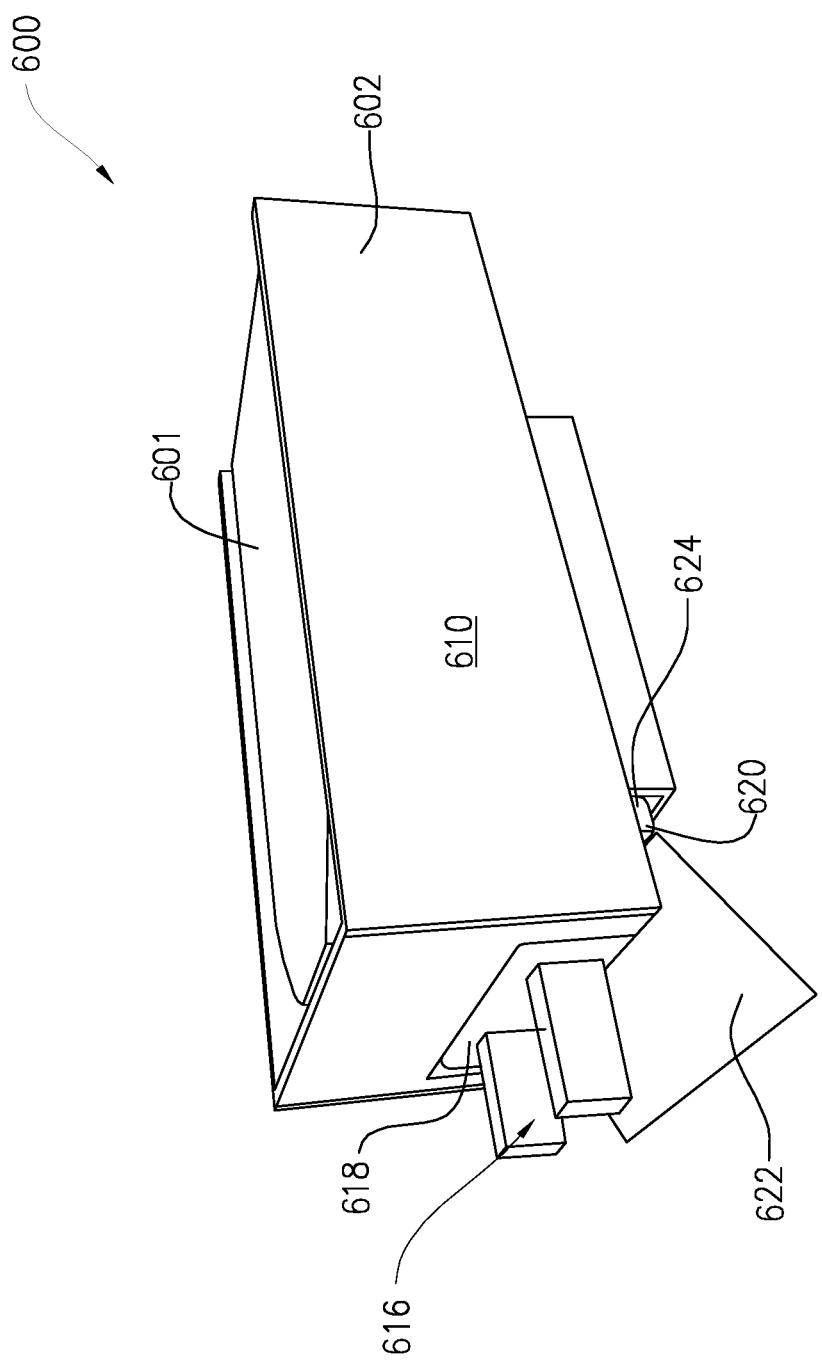
FIG. 7 is a side perspective view of the example device of FIG. 6, with components in a deployed configuration.
Figure 8:
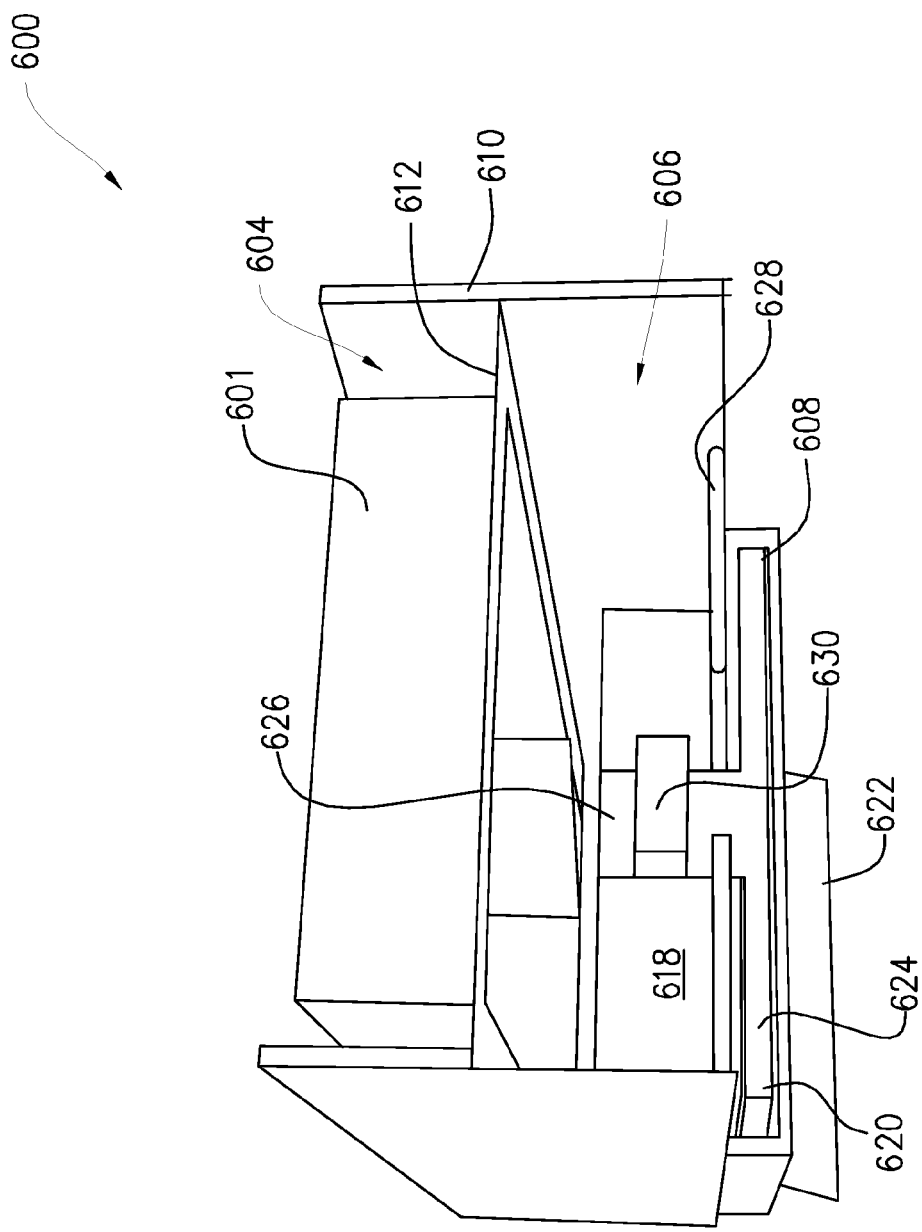
FIG. 8 is a rear perspective view of the device of FIG. 6 in a deployed configuration illustrating sliding movement of a stabilizer and electrical interface.

FIGS. 6-8 collectively illustrate an example charging case 600 for a computing device 601. The charging case 600 comprises a body 602 that is configured to receive a computing device 601 such as a Smartphone. In one embodiment, the body 602 comprises a device receiving compartment 604, a middle compartment 606 (also referred to herein as a first compartment), and a lower-most compartment 608 (also referred to herein as a second compartment).

In one embodiment, the device receiving compartment 604 is configured to protectingly surround at least a portion of a computing device 601. In some embodiments, the computing device 601 nests within the device receiving compartment 604 in such a way that a touch screen display or a keyboard of the computing device 601 is exposed, to allow a user to utilize the touch screen display and/or the keyboard.

By way of example, the device receiving compartment 604 cradles the computing device 601 as with a cell phone case that protects a Smartphone. The device receiving compartment 604 can also be configured to receive and retain a computing device such as a laptop. In some embodiments where the charging case 600 receives a laptop, the charging case 600 can function as a part of the chassis of the laptop.

Thus, in another embodiment the device receiving compartment 604 is defined by a sidewall 610 that covers at least a portion of a sidewall of the computing device 601. The back surface or lower surface of the computing device 601 contacts an inner surface 612 of the device receiving compartment 604.

The middle compartment 606 is positioned below or behind the device receiving compartment 604. The middle compartment 606 receives and retains a charging circuit 614.

Examples of charging circuit 614 are described above with respect to charging circuit 116 and illustrated in FIGS. 3 and 4.

In some embodiments, the charging circuit 614 can be omitted all together, such as when the DC source provides a DC power signal that does not require amplification or any signal processing.

Rather than plugging into a USB electrical outlet, the electrical connector can be coupled with a USB port of another computing device, such as a laptop computer or a charger device that plugs into a standard two or three pronged electrical wall outlet.

Figure 17:
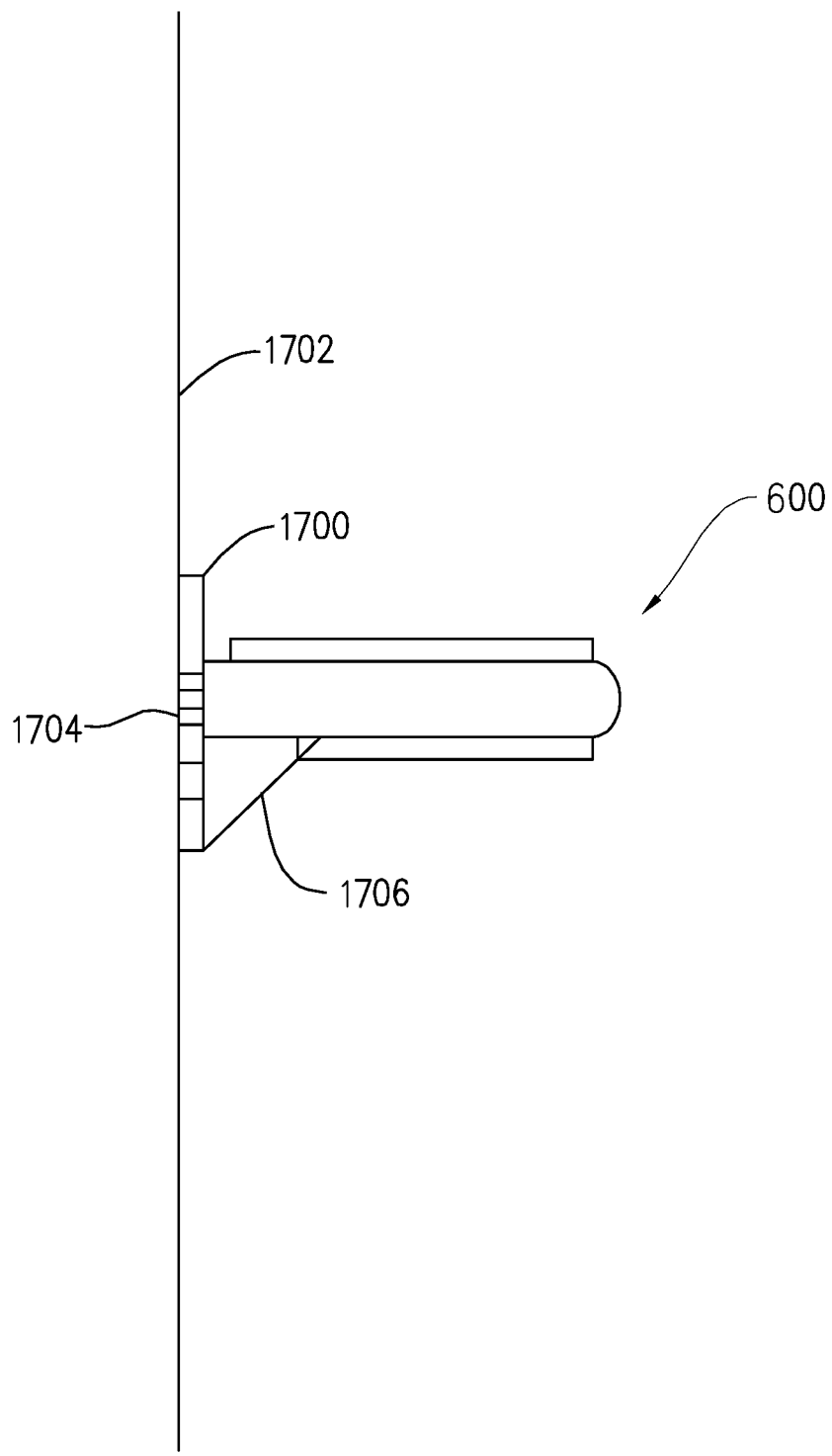
FIG. 17 illustrates the example embodiment of the example device of FIG. 6 in use.

In one embodiment, a charging circuit 614 is housed within a circuit enclosure 618. The circuit enclosure 618 is disposed within the middle compartment 606. In some embodiments, the circuit enclosure 618 can freely translate forwards and backwards within the middle compartment 606. This allows a charging interface 616 to be translated between a deployed configuration (as illustrated in FIG. 7, for example) and a stored configuration (as illustrated in FIG. 6, for example). In FIG. 6, the charging interface 616 comprises a pair of electrical prongs. In various other embodiments, the charging interface 616 may comprise a USB connector, a micro USB connector, or any other connector capable of interfacing with a DC source. The electrical prongs are received within an electrical outlet, as best illustrated in FIG. 17, which illustrates the charging case 600 in use.

In one embodiment, the lower-most compartment 608 can house a stabilizer 620 that stabilizes the charging case 600 against a wall or other similar surface when the charging interface 616 is deployed. To be sure, the weight of the charging case 600 in combination with the weight of computing device 601 could potentially damage electrical prongs when the electrical prongs are placed in the outlet, by bending of the electrical prongs. The stabilizer 620 (as illustrated in FIGS. 7 and 8, for example) supports at least a portion of the weight that would otherwise be exerted upon the electrical prongs. In another embodiment, the stabilizer 620 includes a flat plate that slides in and out of the lower-most compartment 608. As illustrated in FIG. 7, the stabilizer 620 can comprise a fold-down flap portion 622 that extends at an angle relative to the charging case 600. The fold-down flap portion 622 can be hingedly connected to the first portion 624 of the stabilizer 620 when it remains mostly within the lower-most compartment 608.

In some embodiments, the stabilizer 620 and circuit enclosure 618 can translate independently from one another. For example, the circuit enclosure 618 can be translated forwardly and backwardly as desired to deploy or store the charging interface 616, without requiring the use of the stabilizer 620.

In one embodiment, the stabilizer 620 provides an additional point of contact to support the computing device 601 and charging case 600 against a wall or other similar vertical surface.

FIG. 8 illustrates a coupling of a circuit enclosure 618 with a stabilizer 620. In one embodiment, a connector bar 626 couples a circuit enclosure 618 in the stabilizer 620. To permit for movement of the connector bar 626, a divider 628 that divides the middle compartment 606 from the lower-most compartment 608 is notched. The connector bar 626 (also referred to herein as a linkage) can move forward and backward due to the presence of the notch within the divider 628.

In some embodiments, a finger tab or protrusion 630 is disposed on the connector bar 626. The protrusion 630 allows a user to push or pull the circuit enclosure 618 and stabilizer 620, to deploy or store the charging interface 616 and/or stabilizer 620. For example, pushing the protrusion 630 forwardly causes the circuit enclosure 618 and stabilizer 620 to move forwardly, placing the charging interface 616 and/or stabilizer 620 in a deployed configuration. The user can pinch and pull the protrusion 630 backwardly to cause the charging interface 616 to be stored within the middle compartment 606 and the stabilizer 620 to retract into the lower-most compartment 608.

Figure 9:
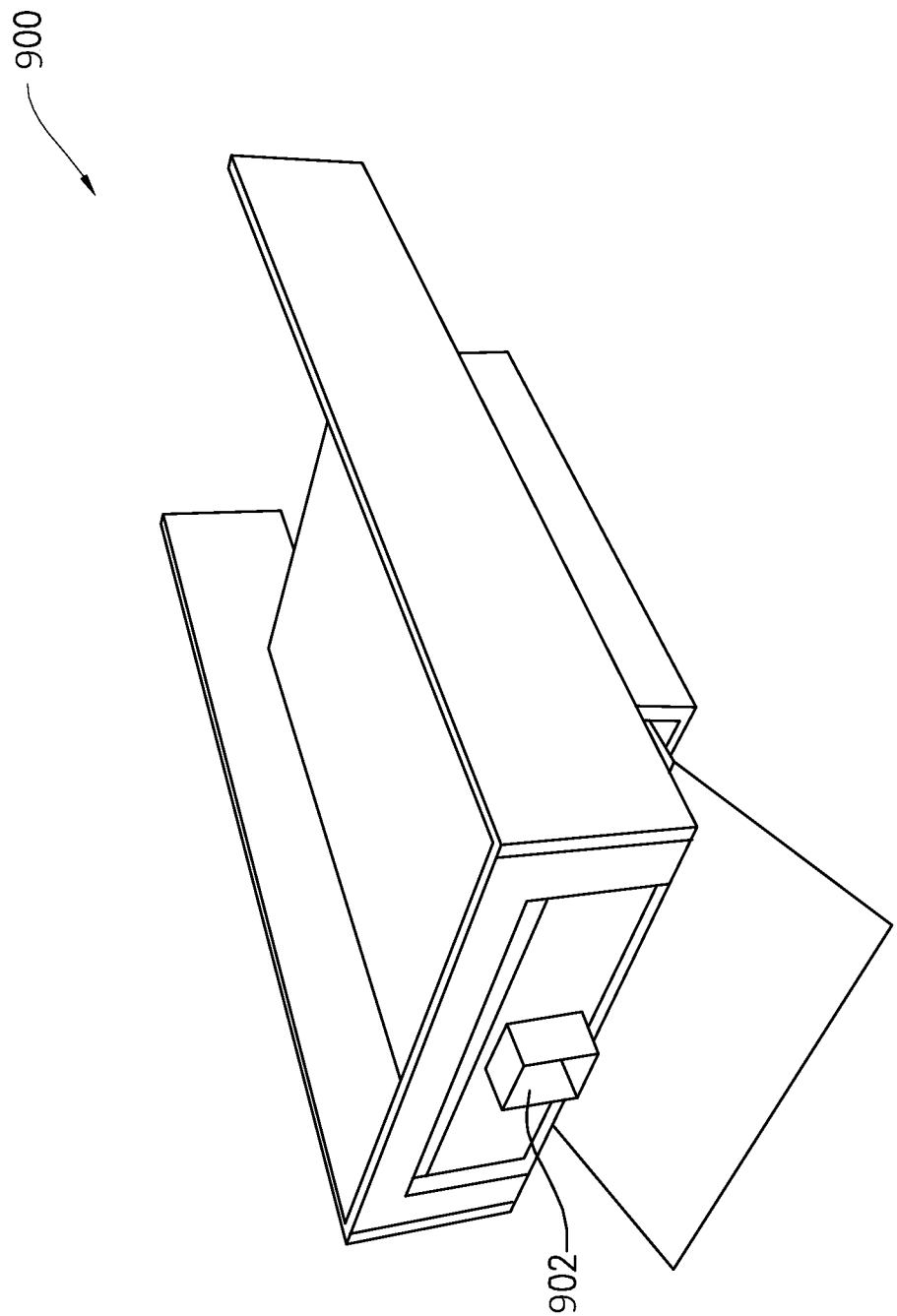
FIG. 9 is a perspective view of another example embodiment of the present disclosure having a vertically oriented USB connector.

FIG. 9 illustrates another example embodiment of a charging case 900 that is similar in construction to the charging case 600 of FIG. 6, with the exception that the charging case 900 comprises a vertically oriented USB connector 902 in place of the electrical prongs in the charging case 600 of FIG. 6. The USB connector 902 is a charging interface that can couple with a DC power source such as a USB port.

Figure 10:
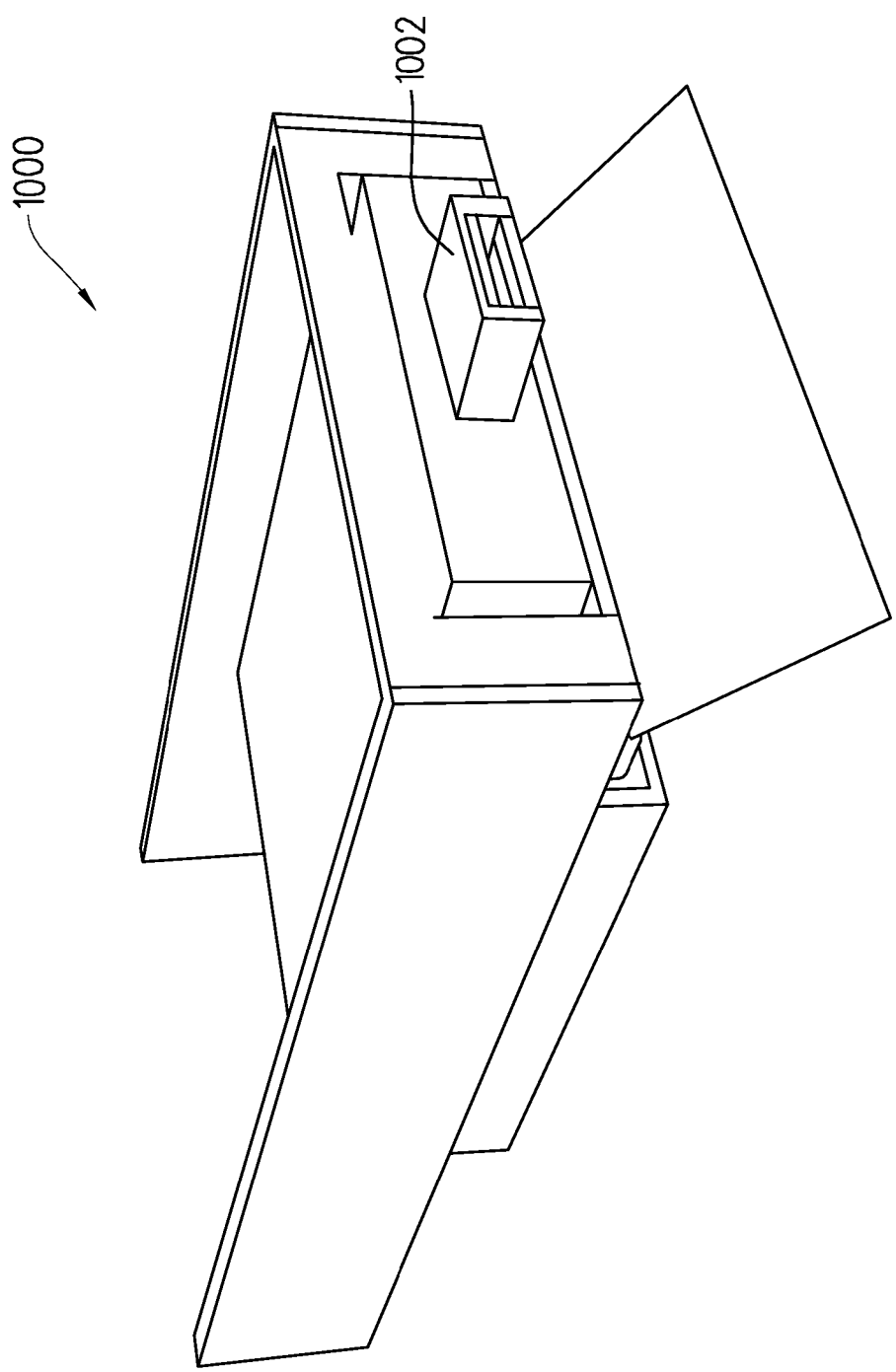
FIG. 10 is a perspective view of another example embodiment of the present disclosure having a horizontally oriented USB connector.

FIG. 10 illustrates another example embodiment of a charging case 1000 that is similar in construction to the charging case 600 of FIG. 6, with the exception that the charging case 1000 comprises a horizontally oriented USB connector 1002 in place of the electrical prongs in the charging case 600 of FIG. 6. Again, the USB connector 1002 is a charging interface that can couple with a DC power source such as a USB port.

Figure 11:
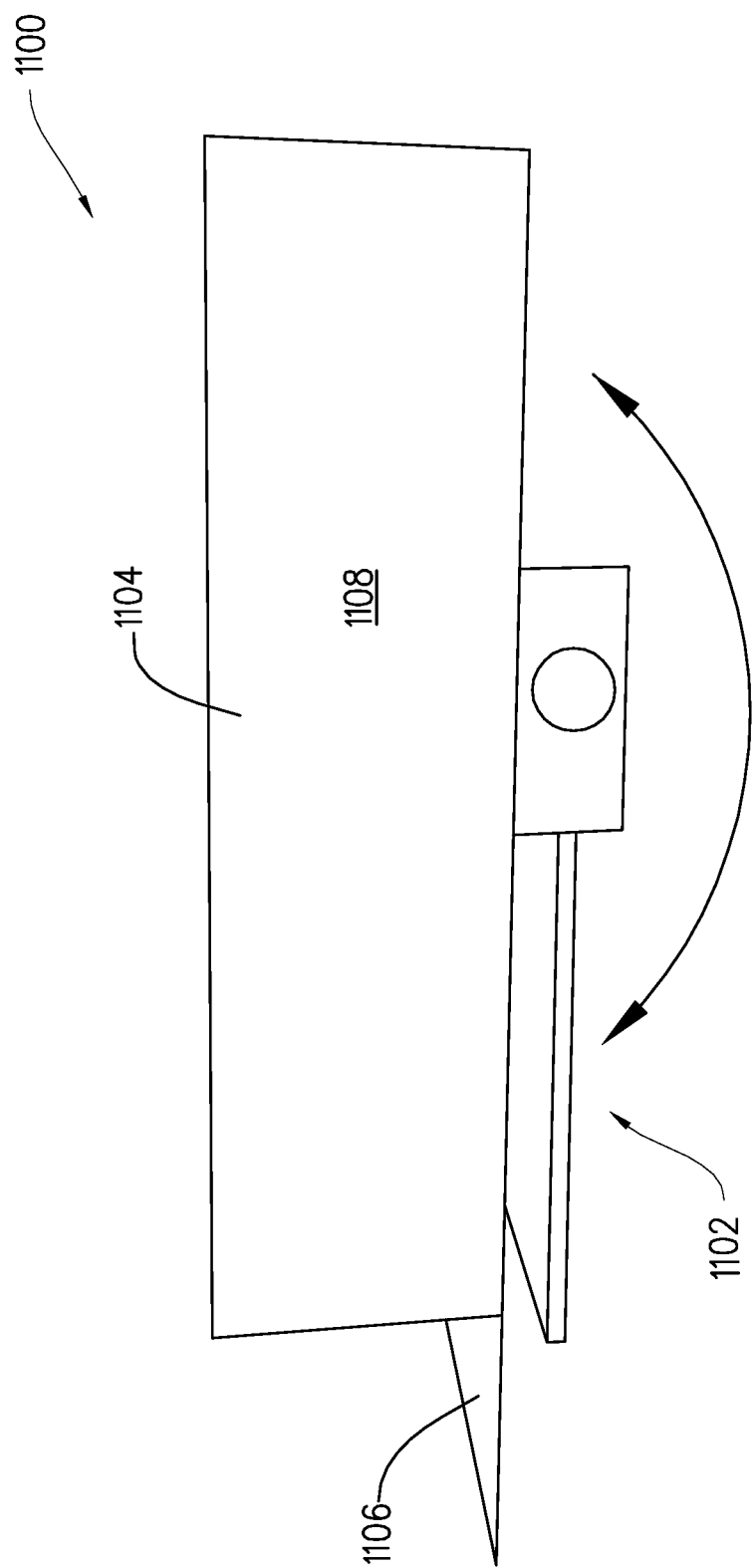
FIG. 11 is a perspective view of another example embodiment of the present disclosure having a pivoting stabilizer.
Figure 12:
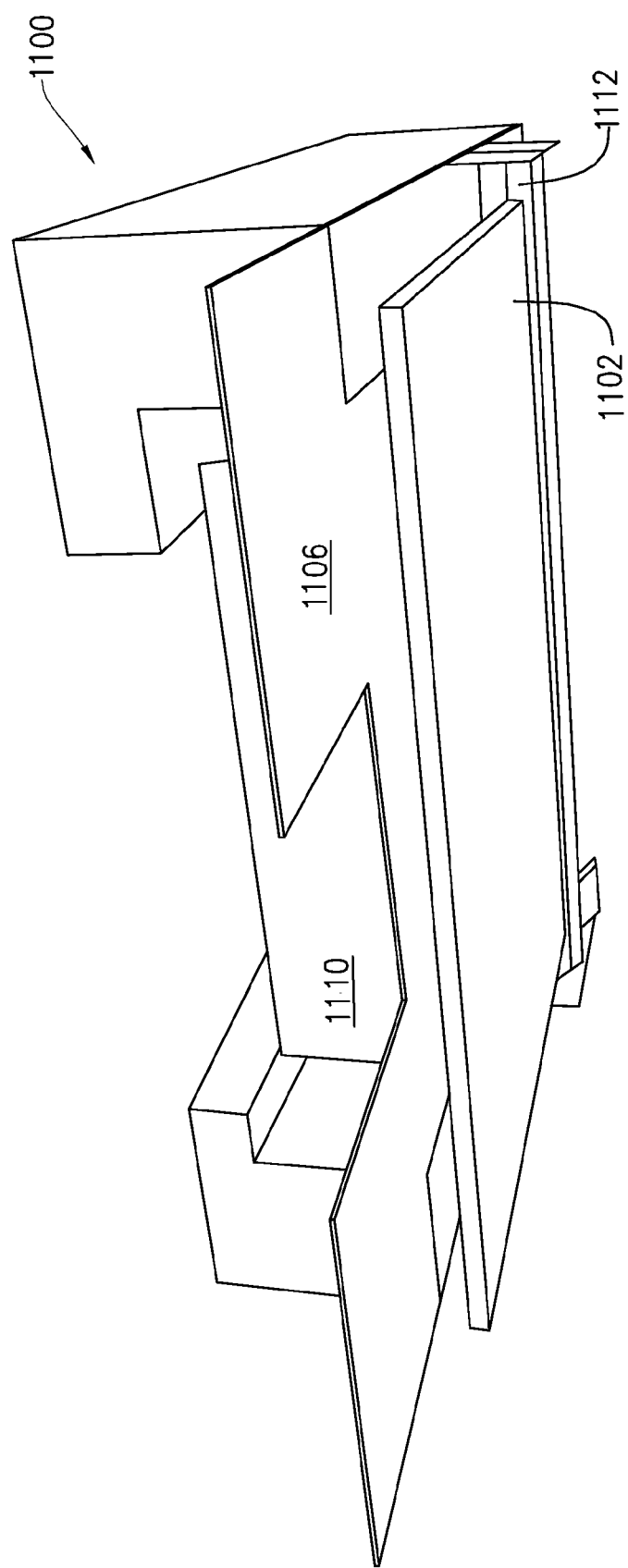
FIG. 12 is a rear perspective view of the device of FIG. 11.

FIG. 11 illustrates another example embodiment of a charging case 1100 that is similar in construction to the charging case 600 of FIG. 6, with the exception that a stabilizer 1102 is not disposed within a compartment, but is instead, pivotally connected to a lower side of the charging case 1100. The charging case 1100 comprises a device receiving tray 1104, which can receive and retain a computing device. In some embodiments, an inner panel 1106 extends beyond a sidewall 1108 of the device receiving tray 1104. As best illustrated in FIG. 12, the inner panel 1106 is notched to allow a finger of the user to press on a charging enclosure 1110 to deploy a charging interface of the charging case 1100 such as electrical prongs or a USB connector. The stabilizer 1102 is illustrated in a stored configuration in FIGS. 11 and 12.

Figure 13:
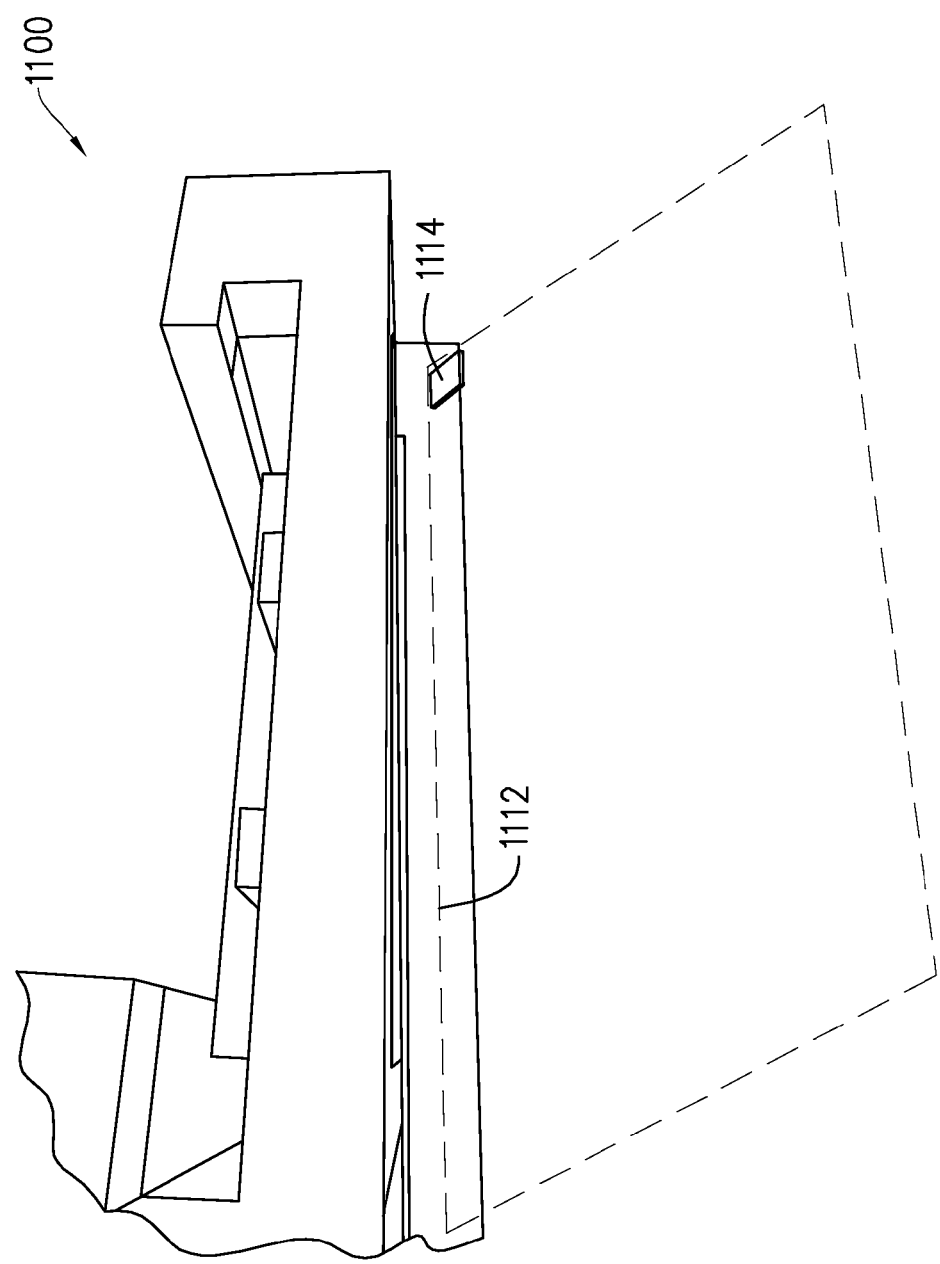
FIG. 13 is a close up front perspective view of the FIG. 11 illustrating a stabilizer locking member.

FIG. 13 illustrates a stabilizer bar 1112 that comprises a locking member or support 1114. The stabilizer 1102 can rotate about the stabilizer bar 1112 and can also slide laterally along the stabilizer bar 1112, such that the stabilizer 1102 can clear the edge of the locking member or support 1114. Once the stabilizer 1102 is rotated above the locking member or support 1114, the stabilizer 1102 can slide over the top of the locking member or support 1114. This stabilizer 1102 can then rest on top of the locking member or support member 1114, so as to secure the stabilizer 1102 in an angled orientation that corresponds to an angle of the locking member or support 1114. For reference, the stabilizer 1102 can be coupled with the stabilizer bar 1112, as illustrated in the additional embodiment of FIG. 12.

Figure 14:
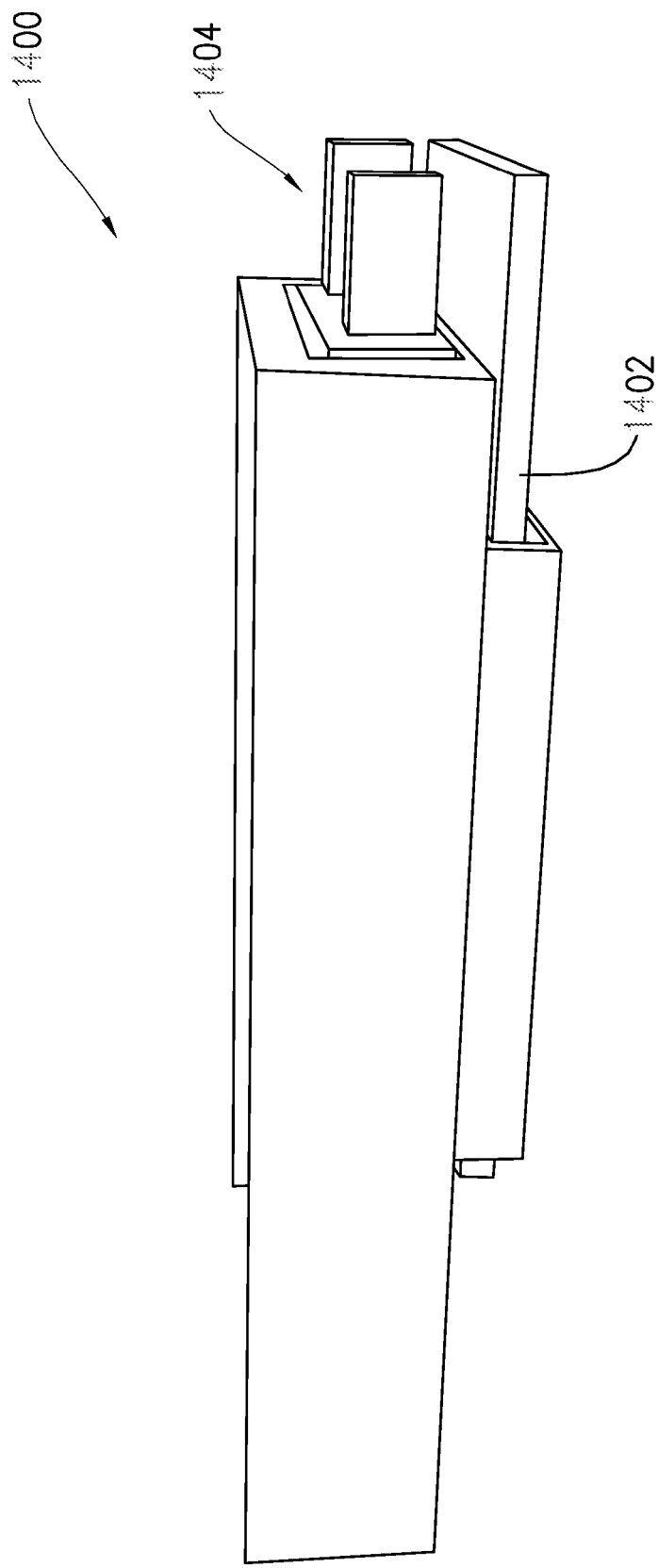
FIG. 14 is a perspective view of another embodiment of the present disclosure.

FIG. 14 illustrates another example embodiment of a charging case 1400 that is similar in construction to the charging case 600 of FIG. 6. In this particular embodiment, a stabilizer 1402, when extended from its compartment, will extend to a length that is equal in length to a charging interface 1404. That is, when the charging interface 1404 is deployed along with the stabilizer 1402, their terminal ends are co-planar or in alignment with one another.

Figure 15:
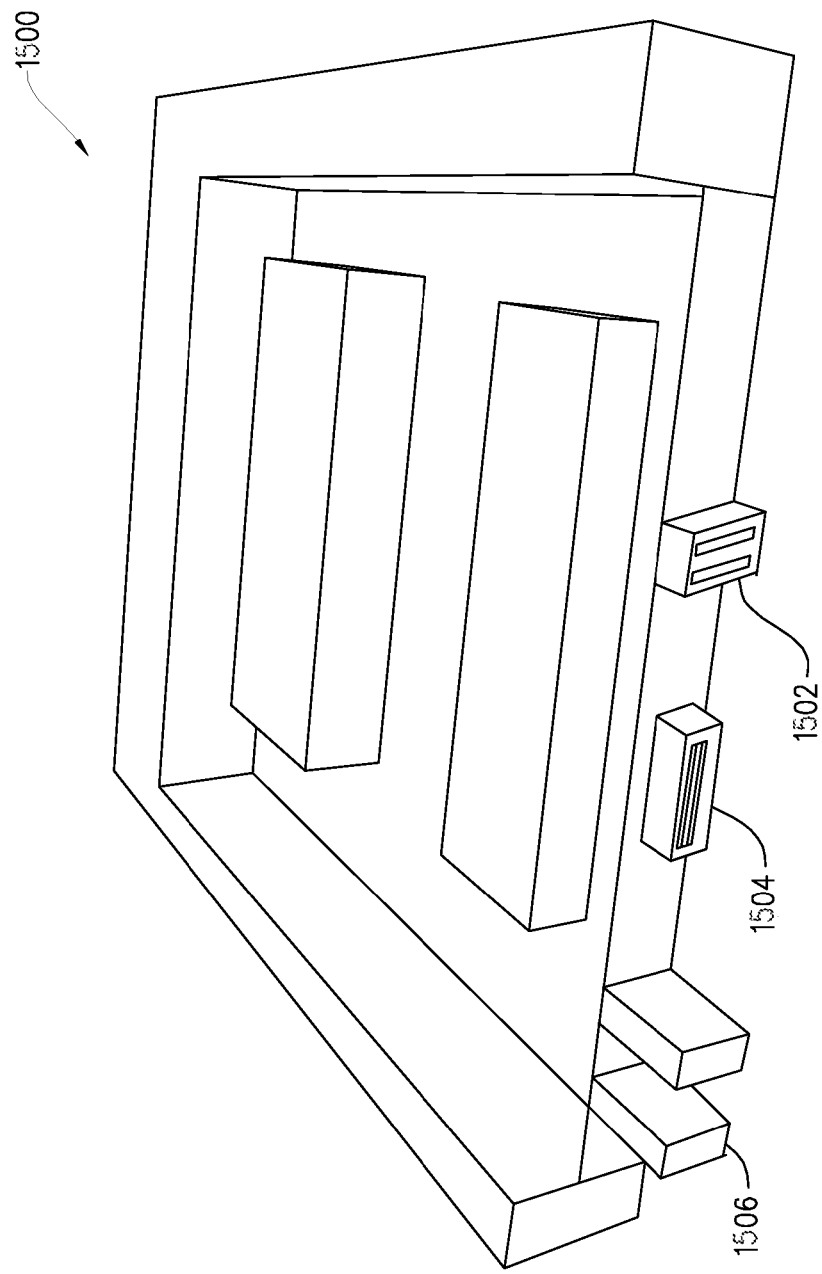
FIG. 15 is a perspective view of a portion of another embodiment of the present disclosure having multiple electrical interfaces.

FIG. 15 illustrates another example embodiment of a charging case 1500 that is similar in construction to the charging case 600 of FIG. 6, with the exception that the charging case 1500 comprises a plurality of charging interfaces. For example, the charging case 1500 can comprise various combinations of a vertically oriented USB connector 1502, a horizontally oriented USB connector 1504, and electrical prongs 1506. Thus, the charging case 1500 may be capable of connecting to both DC and AC power sources. Indeed, the charging case 1500 can comprise two or more different and unique charging interfaces of any selection in various orientations.

Figure 16:
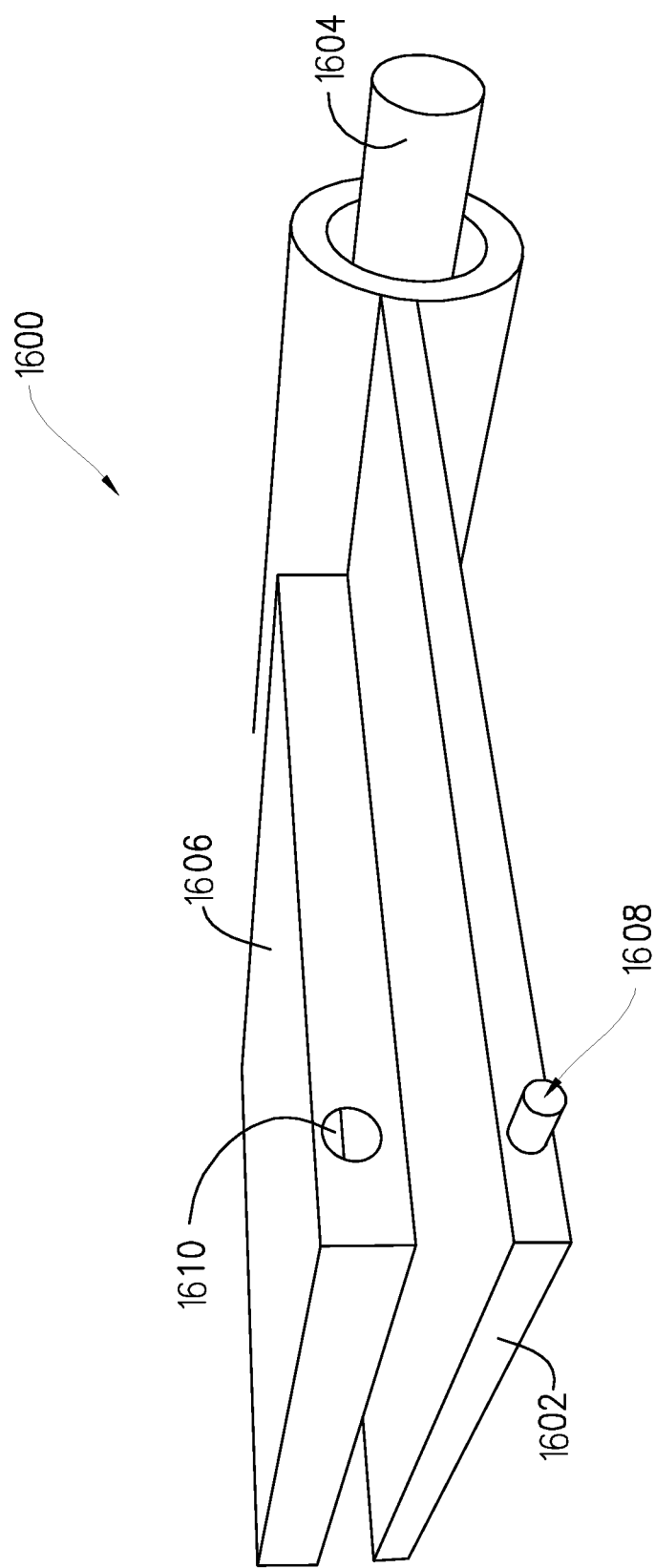
FIG. 16 is a perspective view of another embodiment of the present disclosure having another stabilizer locking member that comprises a pin.

FIG. 16 illustrates another example embodiment of another stabilizer 1600 that can be used in any of the embodiments described above in place of having a charging case's respective stabilizer as previously described. In some embodiments, the stabilizer 1600 comprises a stabilizer plate 1602. The stabilizer plate 1602 can be rotatingly coupled to a stabilizer bar 1604 that can be joined to a charging case housing 1606. In some embodiments, the stabilizer plate 1602 comprises a peg 1608 that is configured to couple within aperture 1610 that is formed into an edge of the charging case housing 1606. The stabilizer plate 1602 can slide laterally along the stabilizer bar 1604.

FIG. 17 illustrates an example embodiment of the charging case 600 of FIG. 6 in use. For example, the charging case 600 can be coupled with an electrical outlet 1700 of a wall 1702. The wall 1702 is a vertically oriented surface that supports the charging case 600. When the charging interface 1704, such as electrical prongs, is inserted into the electrical outlet 1700, a stabilizer 1706, when in the deployed configuration, contacts a portion of the wall 1702 below the electrical outlet 1700 or the electrical outlet 1700 itself. Again, the stabilizer 1706 supports at least a portion of the weight of the charging case 600 and the computing device disposed therein.

Figure 18:
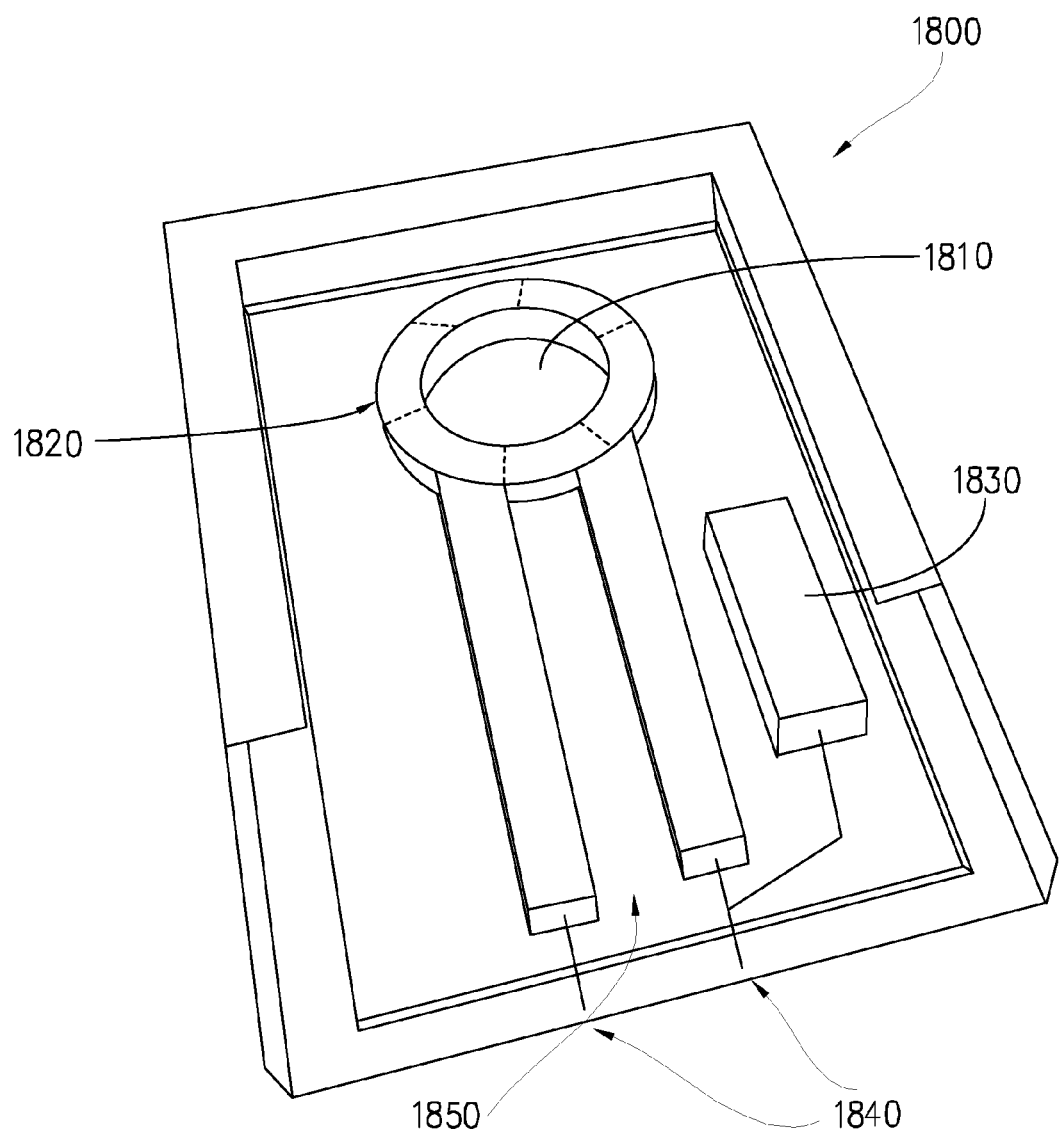
FIG. 18 illustrates an example embodiment of an inductive charging base.

FIG. 18 illustrates an example embodiment of an inductive charging base 1800. In various embodiments, the inductive charging base 1800 includes a primary (induction) coil (also known as a sender coil) 1810, a battery 1830, and a charging interface 1850. Some embodiments of the inductive charging base 1800 can include more than one primary coil 1810. The primary coil 1810 can produce an alternating electromagnetic field (or inductive field) 1820 within the inductive charging base 1800. The electromagnetic field 1820 can be used to charge one or more electronic devices (including, but not limited to, cellular telephones, Smartphones, PDAs, tablets, phablets, laptops, and the like), such as computing device 102 and computing device 601 described above.

More specifically, according to some embodiments, a secondary (induction) coil (also known as a receiver coil) in the exemplary electronic device can receive power from the electromagnetic field 1820 and convert the power into electric current that may be used to charge the battery of the electronic device. When the primary coil 1810 and the secondary coil in the electronic device are in close proximity, the two induction coils combine to form an electrical transformer. Other embodiments of the electronic device may include more than one secondary coil.

In various other embodiments, the inductive charging base 1800 can use resonant inductive coupling, which is the near field wireless transmission of electrical energy between magnetically coupled coils (i.e., the sender coil and the receiver coil). Resonant circuits can enhance the inductive power transmission. This system allows for the transfer of power over greater distances between the sender coil and the receiver coil.

The inductive charging base 1800 can include a battery 1830, according to various embodiments. Battery 1830 provides power for charging when the inductive charging base 1800 is not connected to an external power source, such as power source 1840. In some embodiments, battery 1830 is one or more non-rechargeable batteries such as alkaline cells, lithium cells, carbon-zinc cells, silver-oxide cells, zinc air cells, and the like. In other embodiments, battery 1830 is one or more rechargeable batteries including, but not limited to, lithium-ion, nickel cadmium, nickel metal hydride, and lead acid batteries.

Battery 1830 may be charged (if battery 1830 is a rechargeable battery), for example, when the charging interface 1850 of the inductive charging base 1800 is connected to a power source 1840. Examples of power source 1840 can be a USB port, a standard two or three pronged electrical wall outlet, an external battery pack, or any other similar power sources.

Figure 19:
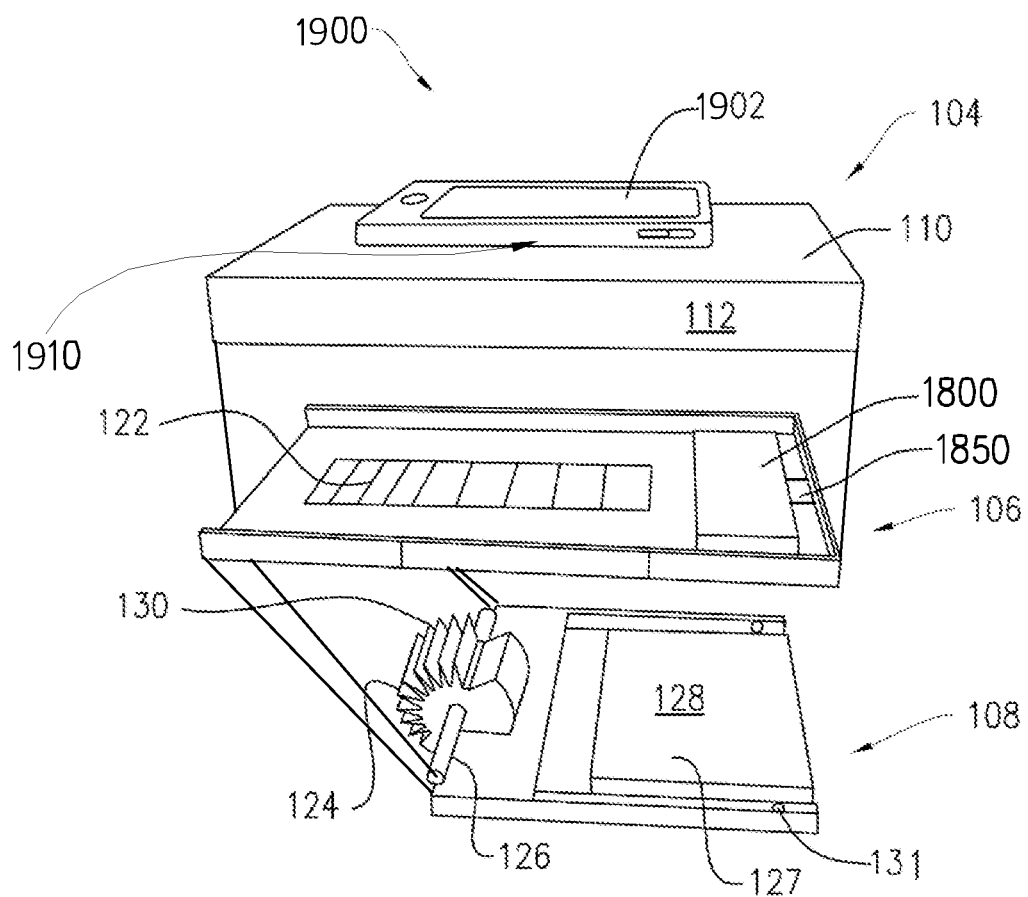
FIG. 19 illustrates an example embodiment of a charging case having an inductive charging base for charging a computing device.

FIG. 19 illustrates an example charging case 1900 having an inductive charging base 1800 for charging a computing device 1902. Charging case 1900 is similar in construction to charging case 100 of FIGS. 1A-2C, but other embodiments include the exemplary inductive charging base 1800 of FIG. 18.

In some embodiments, the charging case 1900 comprises three distinct trays or enclosures such as a device receiving tray 104, a sliding tray 106, and a stabilizer tray 108. In some embodiments, the device receiving tray 104 receives the computing device 1902. For example, the device receiving tray 104 may comprise a support plate 110 and a sidewall 112 that extends around a periphery of the support plate 110. The computing device 1902 resides within the area enclosed by the sidewall 112.

In other embodiments, sliding tray 106 comprises a charging assembly that comprises a charging interface 1850 that receives power from a power source, such as power source 1840 shown in FIG. 18. The charging interface 1850 is coupled to the inductive charging base 1800. In some embodiments, computing device 1902 includes a secondary coil 1910. In other embodiments, computing device 1902 includes more than one secondary coil 1910.

In various embodiments, when the computing device 1902 and the inductive charging base 1800 are in close proximity (for example, when the computing device 1902 is at least partially placed onto or into the device receiving tray 104), the secondary coil 1910 in the computing device 1902 can receive power from the electromagnetic field 1820 produced by the primary coil 1810 of the inductive charging base 1800. The power received can be converted to direct current (DC) to charge the computing device 1902.

The charging of the computing device 1902 can occur when the charging interface 1850 is coupled to a power source 1840. Furthermore, in some embodiments, battery 1830 (if battery 1830 is a rechargeable battery) may also receive power from the power source 1840 when the charging interface 1850 is coupled to the power source 1840. In other embodiments, when the charging interface 1850 is not coupled to the power source 1840, the primary coil 1810 can receive power from the battery 1830 (the battery 1830 may be one or more rechargeable batteries and/or non-rechargeable batteries). In further embodiments, the primary coil 1810 can receive power from both the battery 1830 and the power source 1840 simultaneously.

The other elements in FIG. 19 are described in detail above with respect to the various embodiments of FIGS. 1A-2C.

Figure 20:
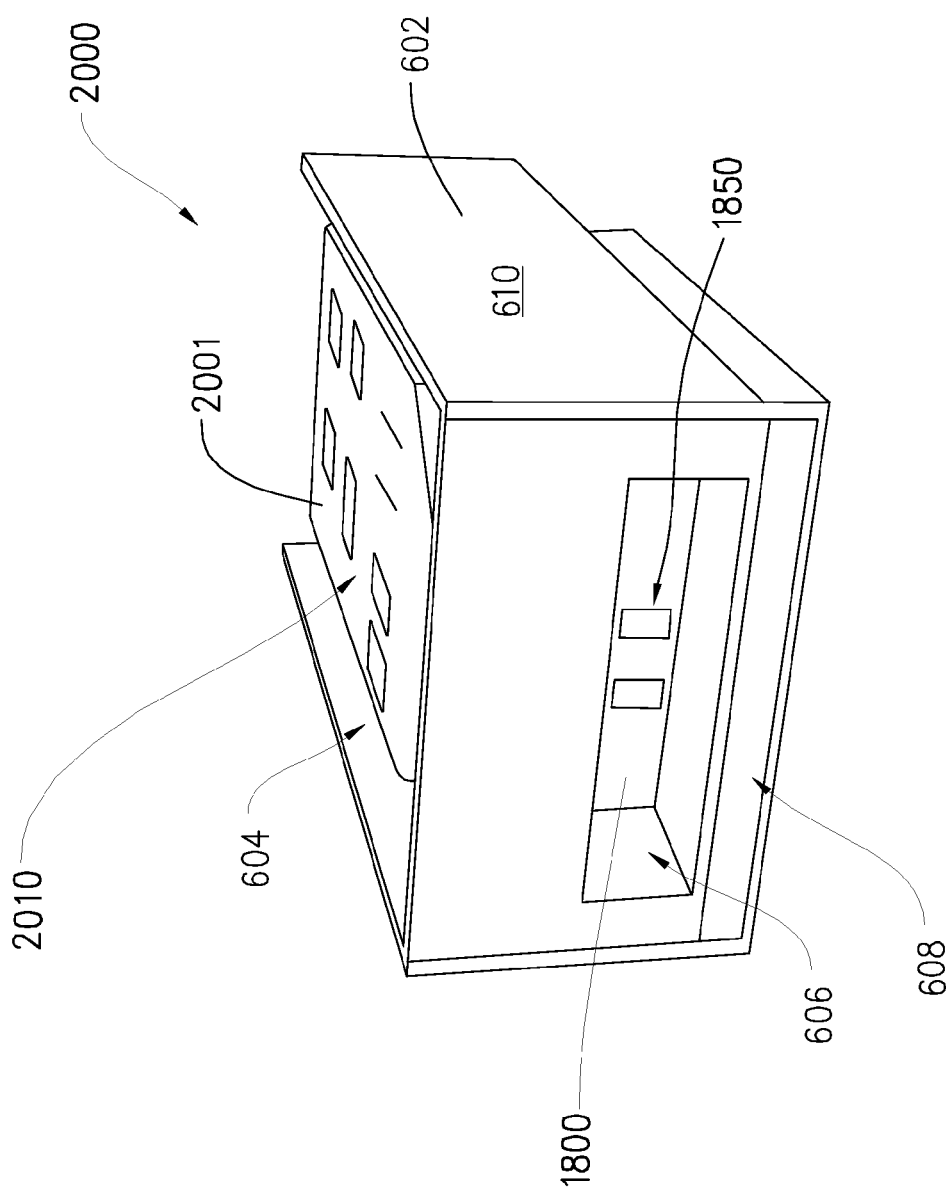
FIG. 20 illustrates another example embodiment of a charging case having an inductive charging base for charging a computing device.

FIG. 20 illustrates another example charging case 2000 having an inductive charging base 1800 for charging a computing device 2001. Charging case 2000 is similar in construction to charging case 600 of FIGS. 6-8, but other embodiments include the exemplary inductive charging base 1800 of FIG. 18.

In some embodiments, the charging case 2000 comprises a body 602 that is configured to receive a computing device 2001 such as a Smartphone. In one embodiment, the body 602 comprises a device receiving compartment 604, a middle compartment 606 (also referred to herein as a first compartment), and a lower-most compartment 608 (also referred to herein as a second compartment).

In other embodiments, inductive charging base 1800 is disposed within the middle compartment 606. In further embodiments, inductive charging base 1800 can freely translate forwards and backwards within the middle compartment 606. This allows a charging interface 1850 to be translated between a deployed configuration (as illustrated in FIG. 7, for example) and a stored configuration (as illustrated in FIG. 6, for example). In FIG. 20, the charging interface 1850 comprises a pair of electrical prongs. In various other embodiments, the charging interface 1850 may comprise a USB connector, a micro USB connector, a three pronged electrical plug, or any other connector capable of interfacing with a DC source. The electrical prongs can be received within an electrical outlet, as best illustrated in FIG. 17, which illustrates the charging case 2000 in use.

In various embodiments, when the computing device 2001 and the inductive charging base 1800 are in close proximity (for example, when the computing device 2001 is at least partially placed onto or into the device receiving compartment 604), a secondary coil 2010 in the computing device 2001 can receive power from the electromagnetic field 1820 produced by the primary coil 1810 of the inductive charging base 1800. The power received can be converted to direct current (DC) to charge the computing device 2001.

The charging of the computing device 2001 can occur when the charging interface 1850 is coupled to a power source 1840. Furthermore, in some embodiments, battery 1830 (if battery 1830 is a rechargeable battery) may also receive power from the power source 1840 when the charging interface 1850 is coupled to the power source 1840. In other embodiments, when the charging interface 1850 is not coupled to the power source 1840, the primary coil 1810 can receive power from the battery 1830 (the battery 1830 may be one or more rechargeable batteries and/or non-rechargeable batteries). In further embodiments, the primary coil 1810 can receive power from both the battery 1830 and the power source 1840 simultaneously.

The other elements in FIG. 20 are described in detail above with respect to the various embodiments of FIGS. 6-8.

The present disclosure has been described more fully with reference to the accompanying drawings, in which example embodiments of the present disclosure are shown. The present disclosure may, however, be embodied in many different forms and should not be construed as necessarily being limited to the example embodiments set forth herein. Rather, these example embodiments are provided so that the disclosure is thorough and complete, and fully conveys the concepts of the present disclosure to those skilled in the art. Also, features described with respect to certain example embodiments may be combined in and/or with various other example embodiments. Different aspects and/or elements of example embodiments, as disclosed herein, may be combined in a similar manner. Further, at least some example embodiments may individually and/or collectively be components of a larger system, wherein other procedures may take precedence over and/or otherwise modify their application. Additionally, a number of steps may be required before, after, and/or concurrently with example embodiments, as disclosed herein. Note that any and/or all methods and/or processes, at least as disclosed herein, can be at least partially performed via at least one entity, at least as described herein, in any manner, irrespective of the at least one entity have any relationship to the subject matter of the present disclosure.

The corresponding structures, materials, acts, and equivalents of all means or step plus function elements in the claims below are intended to include any structure, material, or act for performing the function in combination with other claimed elements as specifically claimed. The description of the present technology has been presented for purposes of illustration and description, but is not intended to be exhaustive or limited to the present technology in the form disclosed. Many modifications and variations will be apparent to those of ordinary skill in the art without departing from the scope and spirit of the present technology. Exemplary embodiments were chosen and described in order to best explain the principles of the present technology and its practical application, and to enable others of ordinary skill in the art to understand the present technology for various embodiments with various modifications as are suited to the particular use contemplated.

In the following description, for purposes of explanation and not limitation, specific details are set forth, such as particular embodiments, procedures, techniques, etc. in order to provide a thorough understanding of the present invention. However, it will be apparent to one skilled in the art that the present invention may be practiced in other embodiments that depart from these specific details.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" or "according to one embodiment" (or other phrases having similar import) at various places throughout this specification are not necessarily all referring to the same embodiment. Furthermore, the particular features, structures, or characteristics may be combined in any suitable manner in one or more embodiments. Furthermore, depending on the context of discussion herein, a singular term may include its plural forms and a plural term may include its singular form. Similarly, a hyphenated term (e.g., "on-demand") may be occasionally interchangeably used with its non-hyphenated version (e.g., "on demand"), a capitalized entry (e.g., "Software") may be interchangeably used with its non-capitalized version (e.g., "software"), a plural term may be indicated with or without an apostrophe (e.g., PE's or PEs), and an italicized term (e.g., "N+1") may be interchangeably used with its non-italicized version (e.g., "N+1"). Such occasional interchangeable uses shall not be considered inconsistent with each other.

Also, some embodiments may be described in terms of "means for" performing a task or set of tasks. It will be understood that a "means for" may be expressed herein in terms of a structure, such as a processor, a memory, an I/O device such as a camera, or combinations thereof. Alternatively, the "means for" may include an algorithm that is descriptive of a function or method step, while in yet other embodiments the "means for" is expressed in terms of a mathematical formula, prose, or as a flow chart or signal diagram.

It is noted at the outset that the terms "coupled," "connected", "connecting," "electrically connected," etc., are used interchangeably herein to generally refer to the condition of being electrically/electronically connected. Similarly, a first entity is considered to be in "communication" with a second entity (or entities) when the first entity electrically sends and/or receives (whether through wireline or wireless means) information signals (whether containing data information or non-data/control information) to the second entity regardless of the type (analog or digital) of those signals. It is further noted that various figures (including component diagrams) shown and discussed herein are for illustrative purpose only, and are not drawn to scale.

If any disclosures are incorporated herein by reference and such incorporated disclosures conflict in part and/or in whole with the present disclosure, then to the extent of conflict, and/or broader disclosure, and/or broader definition of terms, the present disclosure controls. If such incorporated disclosures conflict in part and/or in whole with one another, then to the extent of conflict, the later-dated disclosure controls.

The terminology used herein can imply direct or indirect, full or partial, temporary or permanent, immediate or delayed, synchronous or asynchronous, action or inaction. For example, when an element is referred to as being "on," "connected" or "coupled" to another element, then the element can be directly on, connected or coupled to the other element and/or intervening elements may be present, including indirect and/or direct variants. In contrast, when an element is referred to as being "directly connected" or "directly coupled" to another element, there are no intervening elements present.

Although the terms first, second, etc. may be used herein to describe various elements, components, regions, layers and/or sections, these elements, components, regions, layers and/or sections should not necessarily be limited by such terms. These terms are only used to distinguish one element, component, region, layer or section from another element, component, region, layer or section. Thus, a first element, component, region, layer or section discussed below could be termed a second element, component, region, layer or section without departing from the teachings of the present disclosure.

The terminology used herein is for the purpose of describing particular embodiments only and is not intended to be necessarily limiting of the disclosure. As used herein, the singular forms "a," "an" and "the" are intended to include the plural forms as well, unless the context clearly indicates otherwise. The terms "comprises," "includes" and/or "comprising," "including" when used in this specification, specify the presence of stated features, integers, steps, operations, elements, and/or components, but do not preclude the presence or addition of one or more other features, integers, steps, operations, elements, components, and/or groups thereof.

Example embodiments of the present disclosure are described herein with reference to illustrations of idealized embodiments (and intermediate structures) of the present disclosure. As such, variations from the shapes of the illustrations as a result, for example, of manufacturing techniques and/or tolerances, are to be expected. Thus, the example embodiments of the present disclosure should not be construed as necessarily limited to the particular shapes of regions illustrated herein, but are to include deviations in shapes that result, for example, from manufacturing.

Any and/or all elements, as disclosed herein, can be formed from a same, structurally continuous piece, such as being unitary, and/or be separately manufactured and/or connected, such as being an assembly and/or modules. Any and/or all elements, as disclosed herein, can be manufactured via any manufacturing processes, whether additive manufacturing, subtractive manufacturing and/or other any other types of manufacturing. For example, some manufacturing processes include three dimensional (3D) printing, laser cutting, computer numerical control (CNC) routing, milling, pressing, stamping, vacuum forming, hydroforming, injection molding, lithography and/or others.

Any and/or all elements, as disclosed herein, can include, whether partially and/or fully, a solid, including a metal, a mineral, a ceramic, an amorphous solid, such as glass, a glass ceramic, an organic solid, such as wood and/or a polymer, such as rubber, a composite material, a semiconductor, a nano-material, a biomaterial and/or any combinations thereof. Any and/or all elements, as disclosed herein, can include, whether partially and/or fully, a coating, including an informational coating, such as ink, an adhesive coating, a melt-adhesive coating, such as vacuum seal and/or heat seal, a release coating, such as tape liner, a low surface energy coating, an optical coating, such as for tint, color, hue, saturation, tone, shade, transparency, translucency, non-transparency, luminescence, anti-reflection and/or holographic, a photo-sensitive coating, an electronic and/or thermal property coating, such as for passivity, insulation, resistance or conduction, a magnetic coating, a water-resistant and/or waterproof coating, a scent coating and/or any combinations thereof.

Unless otherwise defined, all terms (including technical and scientific terms) used herein have the same meaning as commonly understood by one of ordinary skill in the art to which this disclosure belongs. The terms, such as those defined in commonly used dictionaries, should be interpreted as having a meaning that is consistent with their meaning in the context of the relevant art and should not be interpreted in an idealized and/or overly formal sense unless expressly so defined herein.

Furthermore, relative terms such as "below," "lower," "above," and "upper" may be used herein to describe one element's relationship to another element as illustrated in the accompanying drawings. Such relative terms are intended to encompass different orientations of illustrated technologies in addition to the orientation depicted in the accompanying drawings. For example, if a device in the accompanying drawings is turned over, then the elements described as being on the "lower" side of other elements would then be oriented on "upper" sides of the other elements. Similarly, if the device in one of the figures is turned over, elements described as "below" or "beneath" other elements would then be oriented "above" the other elements. Therefore, the example terms "below" and "lower" can, therefore, encompass both an orientation of above and below.

While various embodiments have been described above, it should be understood that they have been presented by way of example only, and not limitation. The descriptions are not intended to limit the scope of the invention to the particular forms set forth herein. To the contrary, the present descriptions are intended to cover such alternatives, modifications, and equivalents as may be included within the spirit and scope of the invention as defined by the appended claims and otherwise appreciated by one of ordinary skill in the art. Thus, the breadth and scope of a preferred embodiment should not be limited by any of the above-described exemplary embodiments.

What is claimed is:

1. A charging apparatus for a computing device, the charging apparatus comprising:
   a device receiving tray disposed above a sliding tray, the device receiving tray for receiving and retaining a computing device;
   the sliding tray comprising:
      a charging interface that receives power from a power source;
      an inductive charging base having a primary coil that generates a magnetic field, the inductive charging base coupled to the charging interface; and
      a grooved track;
   a stabilizer tray that is disposed underneath the sliding tray, the stabilizer tray also in sliding relationship with the sliding tray, the stabilizer tray further comprising a stabilizer; and
   a gear having teeth that cooperate with the grooved track such that when the gear is rotated, the teeth of the gear translate the sliding tray backwards and forwards to retract and extend the sliding tray and the charging interface.

2. The charging apparatus according to claim 1, further comprising a means for coupling the primary coil of the inductive charging base to a secondary coil of the computing device.

3. The charging apparatus according to claim 2, wherein the magnetic field generates current within the secondary coil, the current being converted to direct current (DC) to charge a battery of the computing device.

4. The charging apparatus according to claim 1, wherein the stabilizer is a plate that is hingedly associated with a stabilizer bar of the stabilizer tray.

5. The charging apparatus according to claim 1, wherein the stabilizer is a plate that can selectively slide along a stabilizer bar between a locked position and an unlocked position.

6. The charging apparatus according to claim 5, wherein the stabilizer comprises a peg on an edge of the plate that engages with an aperture in a sidewall of the stabilizer tray to lock the plate in an extended configuration when the plate is slid into the locked position.

7. The charging apparatus according to claim 5, wherein the stabilizer tray is hingedly coupled with the sliding tray.

8. The charging apparatus according to claim 1, wherein the gear extends through and below an underside of the stabilizer tray.

9. The charging apparatus according to claim 1, wherein rotation of the gear in a first direction causes the sliding tray to translate forwardly to extend the charging interface into a deployed position.

10. The charging apparatus according to claim 9, wherein rotation of the gear in a second direction causes the sliding tray to translate backwardly to retract the charging interface into a stored position.

11. The charging apparatus according to claim 1, wherein the charging interface comprises electrical prongs or a universal serial bus (USB) connector.

12. A charging case for a computing device, comprising:
   a device receiving tray that protectingly surrounds a computing device in such a way that a touchscreen display or a keyboard is at least partially exposed to allow a user to utilize the touchscreen display or the keyboard;
   an inductive charging base having a primary coil that generates a magnetic field, the inductive charging base being disposed within a middle compartment of the charging case, the middle compartment being disposed behind or below the device receiving tray;

a charging interface selectively extendable from the charging case, the charging interface being coupled to the inductive charging base; and an extendable stabilizer disposed within a rearward compartment behind the middle compartment, the extendable stabilizer translatable between a stored configuration and a deployed configuration.

13. The charging case according to claim 12, further comprising a means for coupling the primary coil of the inductive charging base to a secondary coil of the computing device.

14. The charging case according to claim 13, wherein the magnetic field generates current within the secondary coil, the current being converted to direct current (DC) to charge a battery of the computing device.

15. The charging case according to claim 12, wherein the extendable stabilizer supports both the charging case and the computing device against a vertical surface when the charging interface is plugged into a charging port.

16. The charging case according to claim 12, wherein the charging interface slidingly translates between a deployed position and a stored position.

17. The charging case according to claim 12, wherein a divider that joins the middle compartment and the rearward compartment that houses the extendable stabilizer is notched to allow for a finger of the user when the finger is used to translate the charging interface and the extendable stabilizer.

18. The charging case according to claim 17, wherein the extendable stabilizer and the middle compartment are joined together by a linkage tab that can be pushed or pulled by the user.

19. The charging case according to claim 12, wherein the charging interface comprises any of electrical prongs and a Universal Serial Bus (USB) connector.

20. A case for a computing device, comprising:
a charging case that protectingly surrounds a computing device;
a first compartment coupled to a rearward portion of the charging case;
an inductive charging base having a primary coil that generates a magnetic field, the inductive charging base being within the first compartment;
a charging interface extendable from the charging case, the charging interface disposed within the first compartment and coupled to the inductive charging base;
a second compartment coupled to a rearward portion of the first compartment; and
a stabilizer that is extendable from the second compartment.

21. The case according to claim 20, further comprising a means for coupling the primary coil of the inductive charging base to a secondary coil of the computing device.

22. The case according to claim 21, wherein the magnetic field generates current within the secondary coil, the current being converted to direct current (DC) to charge a battery of the computing device.

23. The case according to claim 20, wherein the stabilizer slidingly translates between a deployed position and a stored position, and the stabilizer and the charging interface are coupled together is such a way that translation of the stabilizer causes a corresponding translation of the charging interface.

24. The case according to claim 23, further comprising a finger tab that extends from a connector bar that joins the stabilizer and the charging interface.

25. The case according to claim 20, further comprising one or more additional charging interfaces, wherein the charging interface comprises electrical prongs and the one or more additional charging interfaces comprise at least one or more of a vertically oriented USB interface and a horizontally oriented USB interface.

\* \* \* \* \*